(12) United States Patent
Shimauchi et al.

(10) Patent No.: US 6,553,122 B1
(45) Date of Patent: Apr. 22, 2003

(54) METHOD AND APPARATUS FOR MULTI-CHANNEL ACOUSTIC ECHO CANCELLATION AND RECORDING MEDIUM WITH THE METHOD RECORDED THEREON

(75) Inventors: Suehiro Shimauchi, Tokyo (JP); Yoichi Haneda, Tokyo (JP); Shoji Makino, Tokyo (JP); Yutaka Kaneda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/260,515

(22) Filed: Mar. 2, 1999

(30) Foreign Application Priority Data

Mar. 5, 1998 (JP) ............................................ 10-053747

(51) Int. Cl.⁷ ................................................ H03B 3/20
(52) U.S. Cl. .................. 381/66; 379/406.08; 379/406.1
(58) Field of Search ............................ 381/66, 93, 71.8, 381/71.11, 71.12; 379/406.01–406.16

(56) References Cited

U.S. PATENT DOCUMENTS 5,828,756 A * 10/1998 Benesty et al. ......... 379/406.08

FOREIGN PATENT DOCUMENTS

| EP | 0 561 133 A | 9/1993 |
| EP | 0 709 999 A | 5/1996 |
| EP | 0 766 466 A | 4/1997 |

* cited by examiner

Primary Examiner—Ping Lee
(74) Attorney, Agent, or Firm—Connolly Bove Lodge & Hutz LLP

(57) ABSTRACT

Even if received signals are highly cross-correlated, echoes can be effectively cancelled and no psychoacoustical problems arise.

A received signal $x_i(k)$ (where $i=1, 2, \ldots, N$) and an additive signal $a_i(k)$ are added together, and the added output is used to drive a speaker i and input into an echo cancellation filter $405_i$. The received signal $x_i(k)$ and the additive signal $a_i(k)$ are input into adaptive filters $401_i$ and $402_i$, respectively. The difference between the sum of the outputs from all the filters $401_i$ and all the filters $402_i$ and an echo $y_m(k)$ is detected as an error $e_m(k)$. The coefficients of all the filters $401_i$ and $402_i$ are updated to reduce the error $e_m(k)$. When the error $e_m(k)$ is made sufficiently small, the coefficients of the filters $402_i$ are transferred to the filters $405_i$. The sum of the outputs from all the filters $405_i$ is detected as an echo replica, and the difference between the echo replica and the echo $y_m(k)$ is output.

48 Claims, 15 Drawing Sheets

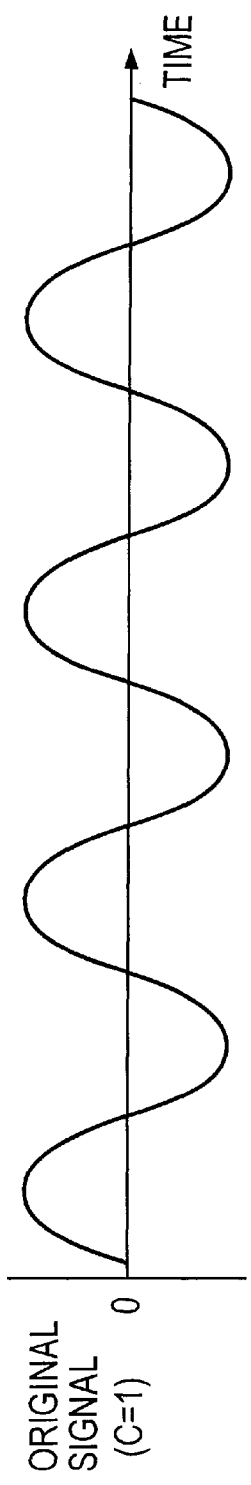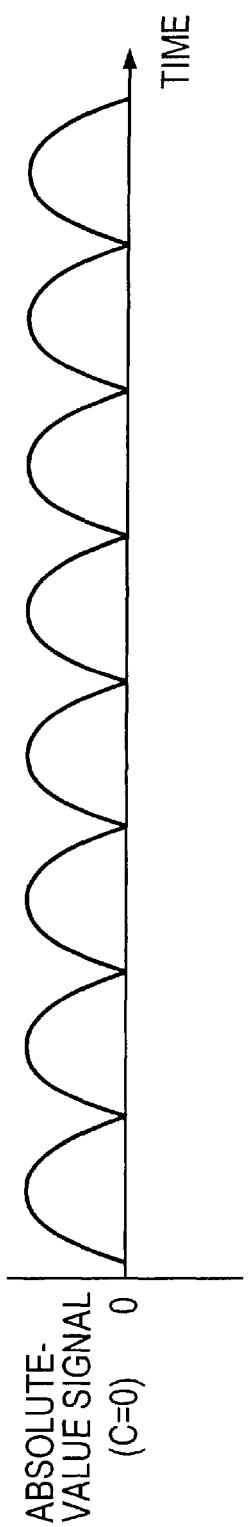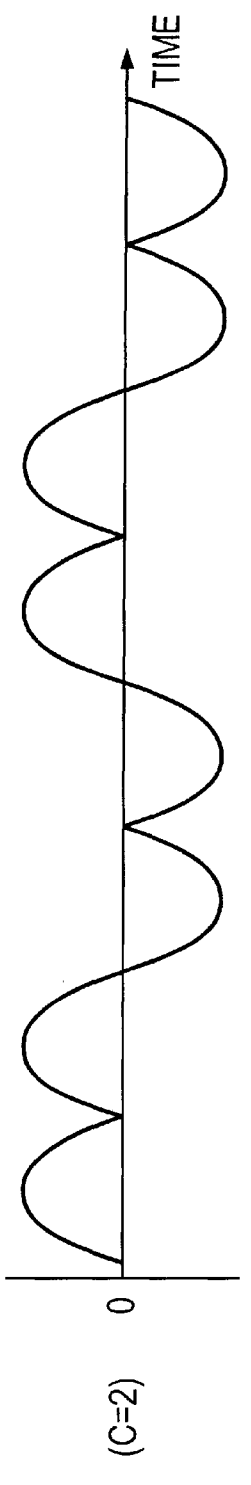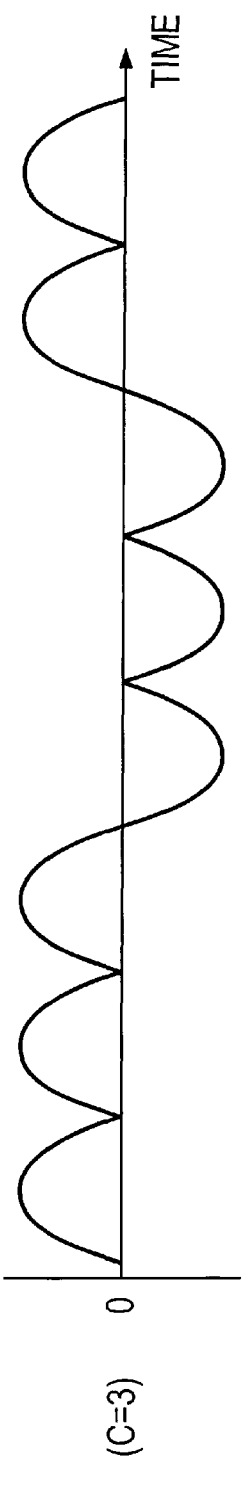
FIG. 6A ORIGINAL SIGNAL (C=1)
FIG. 6B ABSOLUTE-VALUE SIGNAL (C=0)
FIG. 6C (C=2)
FIG. 6D (C=3)

METHOD AND APPARATUS FOR MULTI-CHANNEL ACOUSTIC ECHO CANCELLATION AND RECORDING MEDIUM WITH THE METHOD RECORDED THEREON

BACKGROUND OF THE INVENTION

The present invention relates to a multi-channel acoustic echo cancellation method and apparatus which cancel acoustic echoes that cause howling and give rise to psychoacoustical problems in a teleconference system provided with a multi-receive-channel system, and a recording medium that has recorded thereon a program for implementing the multi-channel acoustic echo cancellation.

In recent years, various forms of telecommunication have emerged with the widespread proliferation of digital networks, such as ISDN, LAN and the Internet, and with the development of high efficiency speech and image coding techniques. In a TV conference or desktop teleconference in which each participant can talk while looking at the other party through utilization of a wide screen television, or a personal computer or workstation placed at the participant's seat, a hands-free telecommunication system is often employed which allows two or more persons to participate in the conversation with ease and provides a more realistic teleconferencing environment. However, this system that uses loudspeakers and microphones inevitably suffers from echoes and howling. To overcome this problem, acoustic echo canceller techniques are indispensable.

In such situations as mentioned above, acoustic echo cancellers are now in wide use, but they are mostly for one-channel audio use and cancel an acoustic echo over only one channel from one loudspeaker to one microphone. On the other hand, stereo is common in many TV broadcast programs and music media, and there is also a strong demand for the realization of a multi-channel hands-free telecommunication system. To meet this requirement, it is necessary to implement a multi-channel acoustic echo canceller which permits cancellation of acoustic echoes from two or more loudspeakers (channels) to a microphone. In recent years, technical problems and solutions thereto have been investigated very actively toward the realization of such a multi-channel echo canceller.

Conventionally, such a configuration as depicted in FIG. 1 is used to cancel acoustic echoes in a teleconference system which is composed of a receive system of N ($N \geq 2$) channels and a send system of M ($M \geq 2$) channels. That is, N-channel echo cancellers $22_1, 22_2, \ldots, 22_M$, which constitute an echo cancellation part 22, are connected between received signal terminals $11_1, 11_2, \ldots, 11_N$ of all the N receive channels and each of the M send channels, respectively. Received signals from the received signal terminals $11_1, 11_2, \ldots, 11_N$ of the respective receive channels are applied to loudspeakers $12_1, 12_2, \ldots, 12_N$, from which they are radiated as acoustic signals. The illustrated echo canceller system cancels acoustic echoes which are produced when the acoustic signals are picked up by microphones $16_1, 16_2, \ldots, 16_M$ after propagating over echo paths $15_{nm}$ (where $1 \leq n \leq N$ and $1 \leq m \leq M$).

The N-channel echo cancellers $22_1, 22_2, \ldots, 22_M$ have the same configuration, which is such as depicted in FIG. 2. This configuration is described as being applied to a two-channel system in B. Widow and S. D. Stearns, "Adaptive signal processing," Prince-Hall, Inc., pp.198–200 (1985). In the configuration of FIG. 2, received signals $x_1(k), x_2(k), \ldots, x_N(k)$ are input into adaptive filters $221_1, 221_2, \ldots, 221_N$ each of which form N estimated echo paths. The outputs from the adaptive filters $221_1, 221_2, \ldots, 221_N$ are added together by an adder 222, by which an echo replica $y'_m(k)$ is generated. The difference between the echo replica $y'_m(k)$ and the picked-up output signal (echo) $y_m(k)$ from the microphone $16_m$ is detected by a subtractor 223. An error signal (a residual echo) $e_m(k)$ provided from the subtractor 223 is fed back to the adaptive filters $221_1$ through $221_N$. The error signal and the received signals $x_1(k)$ to $x_N(k)$ are used to determine filter coefficient vectors, for example, by an NLMS algorithm, and the adaptive filters $221_1$ to $221_N$ are controlled adaptively.

Incidentally, though not shown in FIG. 1, the echo cancellers $22_1$ through $22_M$ aim to prevent that when an acoustic signal $z_m(k)$ originally intended to send is input into the microphones $16_1$ to $16_M$ and sent out through the echo cancellers $22_1$ to $22_M$, a reproduced sound from each loudspeaker, picked up by each microphone, is sent out as an echo $y_m(k)$ together with the signal $z_m(k)$. In other words, the error signal $e_m(k)$ provided as the result of echo cancellation contains the signal $z_m(k)$ that ought to be sent. However, the present invention is directed toward the cancellation of an echo signal $y_m(k)$ which is produced when the acoustic signals radiated from the loudspeakers are picked up by the microphone $16m$; hence, no particular mention will be made herein to the signal $z_m(k)$ that ought to be sent.

When cross-correlation among the received signals $x_1(k)$ to $x_N(k)$ is low, the adaptive filters $221_1, 221_2, \ldots, 221_N$ estimate the corresponding echo paths with relatively high accuracy, thus producing echo replicas that accurately simulate the acoustic echoes to be cancelled. In actual teleconferences, however, speech of one speaker is sent over multiple channels from the far end in many cases, and the received signals are so highly cross-correlated that the convergence speeds and accuracies of the adaptive filters are both degraded, often resulting in failure to provide intended echo cancellation capabilities. As a solution to this problem, there is proposed in U.S. Pat. No. 5,661,813 a scheme which reduces or changes the cross-correlation of the received signals by pre-processing them prior to their input into the N-channel echo cancellers $22_1, 22_2, \ldots, 22_M$.

The configuration disclosed in the above U.S. patent is such as depicted in FIG. 3, in which a pre-processing part 30 equipped with the above-mentioned function is placed between the received signal terminals $11_1$ to $11_N$ and the loudspeakers $12_1$ to $12_N$ and the N-channel echo cancellers $22_1$ to $22_M$. In FIG. 4 there is shown an example of the configuration of the pre-processing part 30. The received signals from the received signal terminals $11_1$ to $11_N$ and additive signals, generated in additive signal generating parts $301_1, 301_2, \ldots, 301_N$, are added by adders $302_1, 302_2, \ldots, 302_N$, from which processed signals $x_1'(k), x_2'(k), \ldots, x_N'(k)$ are provided, respectively. In the generation of the additive signals, received signal information may be used or may not be used. By increasing the magnitudes of the additive signals, the convergence characteristics of the adaptive filters $221_1, 221_2, \ldots, 221_N$ can be improved. A similar scheme is disclosed in U.S. Pat. No. 5,828,756. Many of pre-processing syste$_m$s already proposed, for example, in U.S. Pat. No. 5,661,813 and J. Benesty, D. R. Morgan, and M. M. Sondi, "A Better Understanding and an Improved Solution to the Problems of Stereophonic Acoustic Echo Cancellation," Proc. ICASSP97, vol. 1, pp.303–306 (1997), can be implemented by mathematical modifications with the configuration depicted in FIG. 4. For example, even in a pre-processing part which pre-processes each of N-channel signals $x_i(k)$ (where i=1, 2, . . . , N) at a discrete time k by using a processing function $f_i$ (where i=1, 2, . . . , N) and outputs a processed signal $x_i'(k)$ (where i=1, 2, . . . , N) in the following form:

$$x_i'(k)=f_i[x_i(k)] \quad (1)$$

Eq. (1) can be modified as follows:

$$x_i'(k)=x_i(k)+(f_i[x_i(k)]-x_i(k)) \quad (2)$$

Therefore, the additive signal $f_i[x_i(k)]-x_i(k)$ can be regarded as a signal obtained by pre-processing the original signal $x_i(k)$.

With a view to improving the convergence characteristics of the adaptive filters in the N-channel echo cancellers $22_1$, $22_2$, . . . , $22_M$, there has been proposed the scheme that pre-processes the received signals as described above with respect to FIGS. 3 and 4; in practice, however, since the pre-processed signals are output from the loudspeakers $12_1$, $12_2$, . . . , $12_N$, the additive signal needs to have its magnitude suppressed within a range over which the additive signal will not make any psychoacoustical difference between it and the original signal. This limits the improvement in the convergence characteristics of the adaptive filters $22_1$ to $22_N$ and consequently in the echo cancellation performances.

While in the above the prior art has been described as being applied to the acoustic echo cancellation in the multi-channel teleconference system, the principle of acoustic echo cancellation is to cancel the actual echo $y_m(k)$ by simulating the echo path from the loudspeaker to the microphone (that is, by estimating the impulse response of the echo path) through the use of the echo canceller as shown in FIG. 1. This echo cancellation technique is also applicable to the case of picking up an acoustic signal from a desired sound source by a microphone and removing background sound radiated from a loudspeaker, for example, in a hall, theater, dome, or similar building provided with a public address system. Accordingly, the received signal referred to in the following description may be a signal from whatever signal source, as long as it is an electric signal that is provided from a loudspeaker to a playback channel.

SUMMARY OF THE INVENTION

It is an object of the present invention to provide a novel multi-channel acoustic echo cancellation method and apparatus which significantly improve the echo cancellation performance capabilities even when an additive signal by pre-processing is small, and a recording medium having recorded thereon a program for implementing the acoustic echo cancellation.

According to an aspect of the present invention, there is provided a multi-channel acoustic echo cancellation method for an acoustic system which has N receive channels each containing a loudspeaker for generating an acoustic signal from a received signal, N being an integer equal to or greater than 2, and at least one pick-up channel containing a microphone for picking up the acoustic signal, the N loudspeakers and the microphone being placed in a common sound field, the method comprising the steps of:

(a) generating additive signals for the received signals input in the N receive channels, respectively;

(b) adding the received signals of the N receive channels and the additive signals corresponding thereto, to generate processed signals in the N receive channels;

(c) radiating the processed signals in the N receive channels by the loudspeakers of the channels corresponding thereto;

(d) picking up, by microphone of the at least one pick-up channel, a combined acoustic echoe of the reproduced sounds sneaking thereinto from the loudspeakers in the N receive channels, and inputting the combined acoustic echo into the at least one pick-up channel as an acoustic echo signal; and (e) individually processing the N received signals and the N additive signals to generate an echo replica that simulates the acoustic echo signal in the pick-up channel, and subtracting the echo replica from the acoustic echo signal to thereby perform acoustic echo cancellation.

According to another aspect of the present invention, there is provided a multi-channel echo canceller for an acoustic system which has N receive channels each containing a loudspeaker for generating an acoustic signal from a received signal, N being an integer equal to or greater than 2, and at least one pick-up channel containing a microphone for picking up the acoustic signal, the N loudspeakers and the microphone being placed in a common sound field, the echo canceller comprising:

N additive signal generating means for generating additive signals for the received signals input in the N receive channels, respectively;

N processed signal generating means for adding the received signals of the N receive channels and the additive signals corresponding thereto to generate processed signals in the N receive channels;

the N loudspeakers provided in the N receive channels, for radiating the processed signals in the N receive channels;

the microphone for picking up a combined acoustic echo of the reproduced sounds echoes sneaking thereinto from the loudspeakers in the N receive channels, and for inputting into the at least one pick-up channel the combined acoustic echo as an acoustic echo signal;

means for individually processing the N received signals and the N additive signals to generate an echo replica that simulates the acoustic echo signal in the pick-up channel, and for subtracting the echo replica from the acoustic echo signal to thereby perform acoustic echo cancellation.

According to still another aspect of the present invention, there is provided a recording medium on which there is recorded, as a computer program, a procedure for carrying out the multi-channel acoustic echo cancellation method.

BRIEF DESCRIPTION OF THE DRAWINGS

FIG. 6A is a diagram showing an example of the waveform of an original signal;

FIG. 6B is a diagram showing an absolute-value waveform of the original signal of the original signal;

FIG. 6C is a diagram showing an example of a signal waveform generated by reversing the absolute-value signal in sign every two zero-crossing points of the original signal;

FIG. 6D is a diagram showing an example of a signal waveform generated by reversing the absolute-value signal in sign every three zero-crossing points of the original signal;

DETAILED DESCRIPTION OF THE PREFERRED EMBODIMENTS

In the multi-channel acoustic echo cancellation method, the echo cancellation capabilities can be improved by a scheme that adds an additive signals to the original received signals, but the improvement is limited since the additive signals cannot be made large owing to a psychoacoustical restriction. In other words, this problem might be said to partly come from an insufficient exchange of information between the pre-processing part 30 and the N-channel echo cancellers $22_1$ to $22_N$ in FIG. 3. In the processed signal which is the sum of the received signal and the small additive signal, the information of the latter is buried in the information of the former. Hence, it is difficult with the conventional N-channel echo canceller to effectively extract the additive signal information from the processed signal input thereinto.

Figure 1:
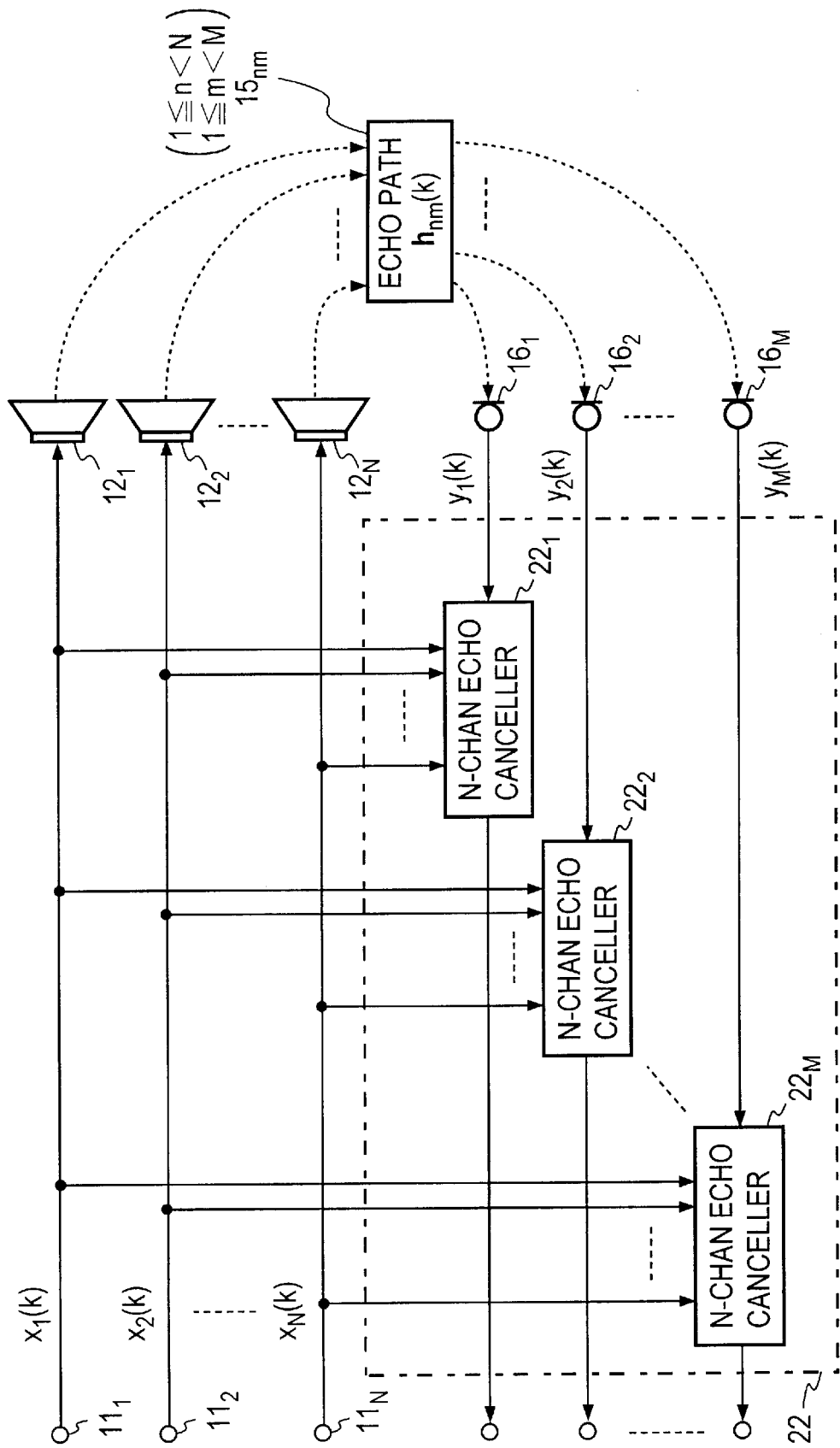
FIG. 1 is a schematic diagram depicting the functional configuration of a conventional multi-channel acoustic echo canceller.
Figure 2:
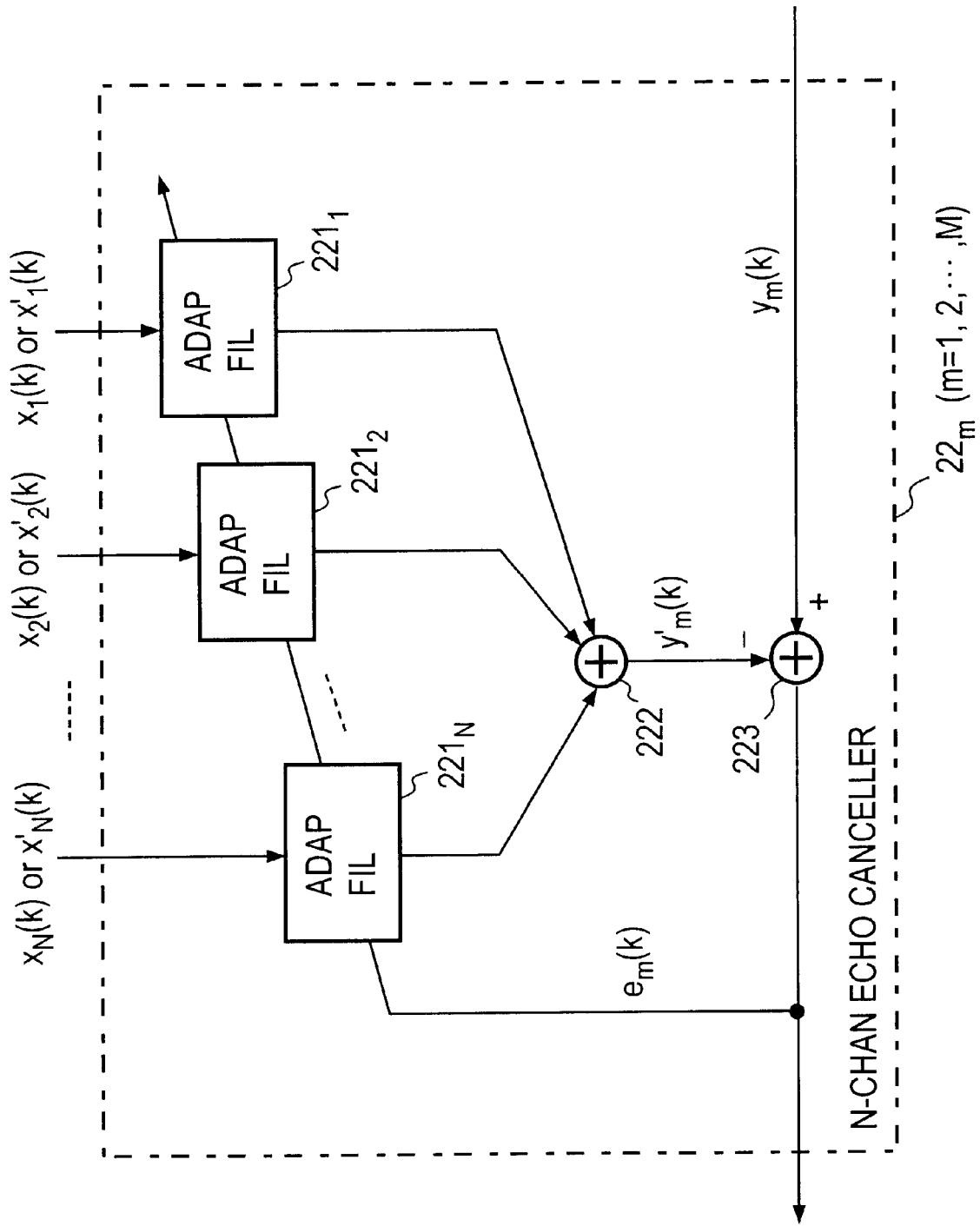
FIG. 2 is a block diagram showing the functional configuration of an N-channel echo canceller $22_m$ in FIG. 1.
Figure 5:
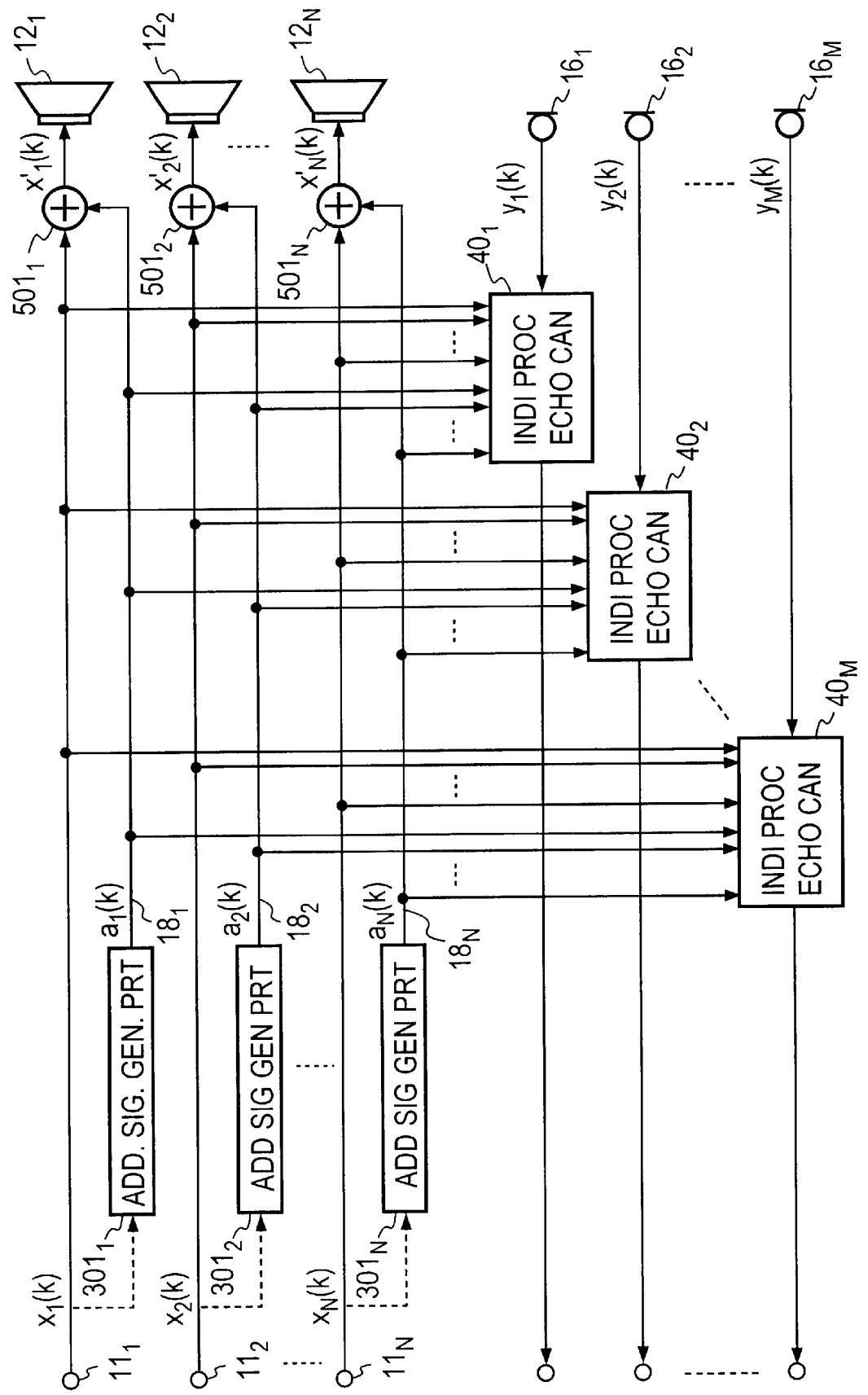
FIG. 5 is a block diagram illustrating a basic configuration of the present invention.

In view of the foregoing, according to the present invention, provision is made to directly supply the echo canceller with the information of the additive signal. FIG. 5 illustrates in block form the basic configuration of the multi-channel acoustic echo canceller according to the present invention. This acoustic echo canceller is also common to the prior art example of FIG. 1 in the configuration wherein: the additive signal generating parts $301_1$ to $301_N$ and adders $501_1$ to $501_N$ are provided in pairs in the respective receive channels; the microphones $16_1$ to $16_M$ and echo cancellers $40_1$ to $40_M$ are provided in pairs in the respective send channels; the received signals $x_1(k)$ to $x_N(k)$ and the additive signals $a_1(k)$ to $a_N(k)$ are added by the adders $501_1$ to $501_N$, respectively; and the addition results (i.e., processed signals) $x_1'(k)$ to $x_N'(k)$ are fed to the loudspeakers $12_1$ to $12_N$, respectively.

Figure 3:
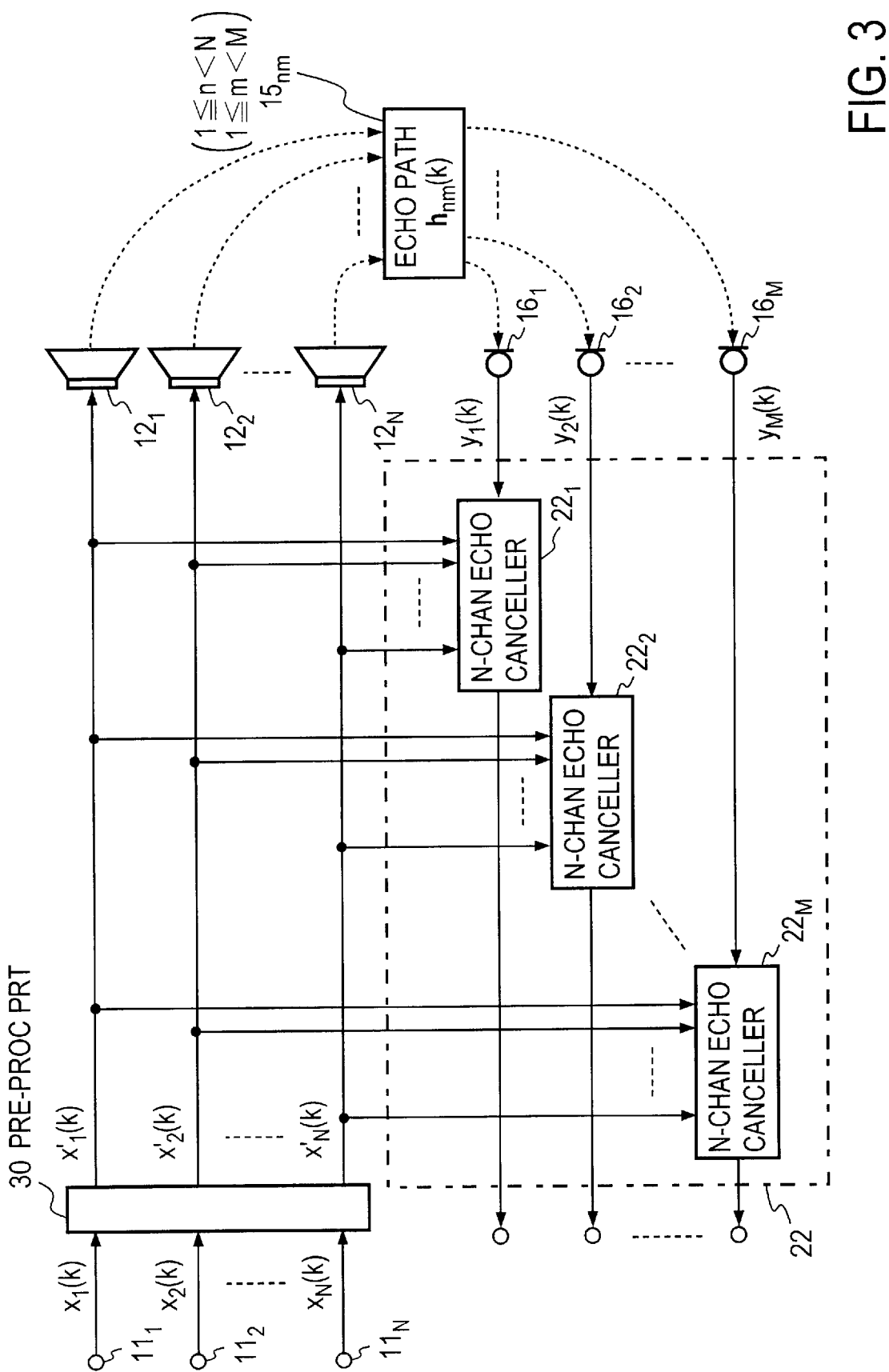
FIG. 3 is a schematic diagram depicting the functional configuration of an improved conventional multi-channel acoustic echo canceller.
Figure 4:
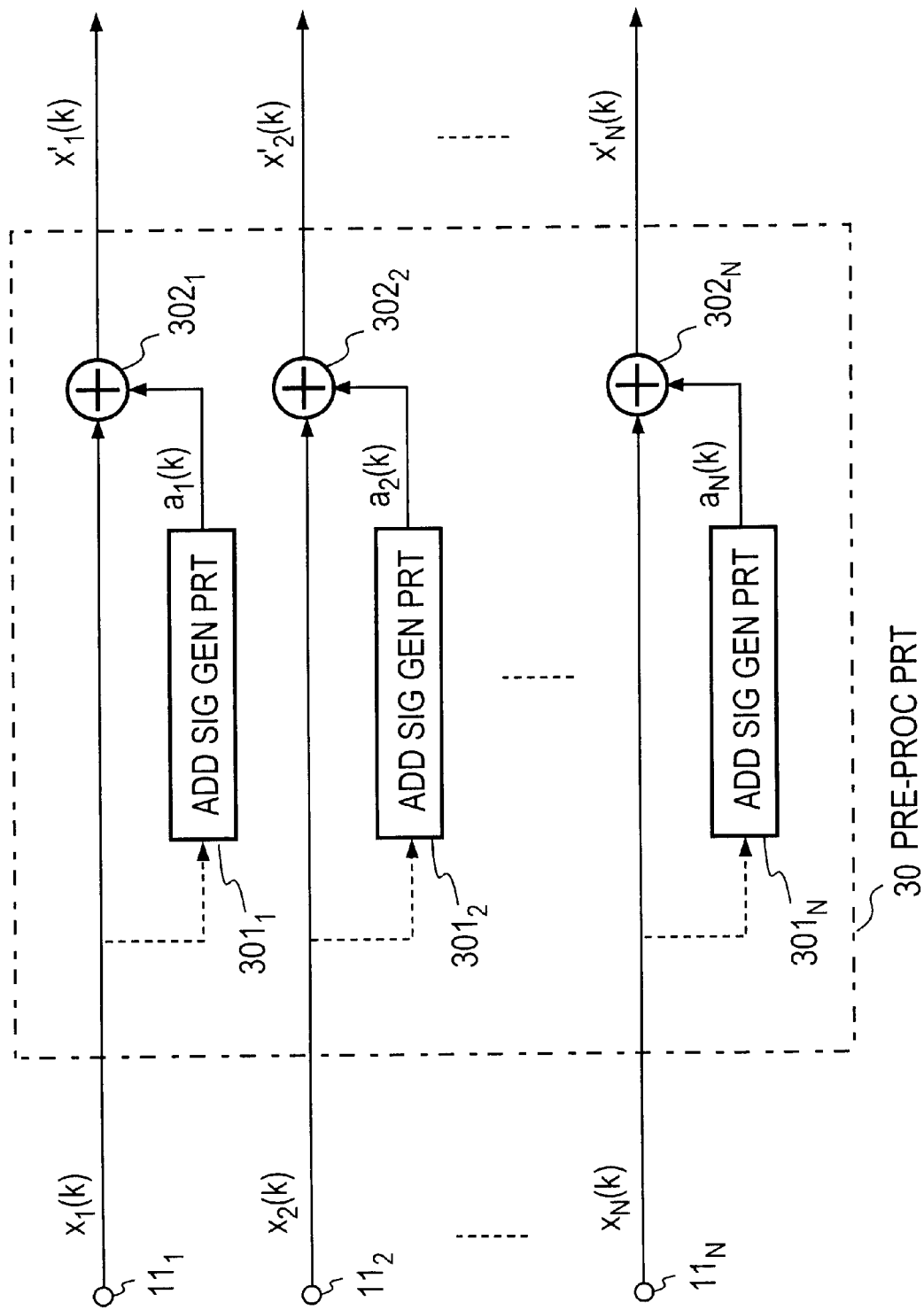
FIG. 4 is a block diagram showing a concrete functional configuration of a pre-processing part 30 in FIG. 3.

The illustrated echo canceller differs from the prior art example in that the received signals $x_1(k)$ to $x_N(k)$ and the additive signals $a_1(k)$ to $a_N(k)$ are applied to individual processing type echo cancellers $40_1$ to $40_M$ corresponding to the respective send channels to estimate echoes $y_1(k)$ to $y_M(k)$ in those send channels. That is, in the prior art example of FIG. 4 the received signals $x_1(k)$, $x_2(k)$, ..., $x_N(k)$ are added with the additive signals $a_1(k)$, $a_2(k)$, ..., $a_N(k)$ of the corresponding channels, and the addition results (that is, the pre-processed signals) are applied to the echo cancellers $22_1$ to $22_M$ of the send channels as depicted in FIG. 3 to generate the echo replicas. According to the present invention, as shown in FIG. 5, the received signals $x_1(k)$, $x_2(k)$, ..., $x_N(k)$ and the additive signals $a_1(k)$, $a_2(k)$, ..., $a_N(k)$ are individually applied to the individual processing type echo cancellers $40_1$, $40_2$, ..., $40_M$ prior to the addition of the additive signals to the received signals, and the received signal $x_i(k)$ (where i=1, 2, ... N) and the additive signal $a_i(k)$ are added together by the adder $501_i$ independently of their application to the echo cancellers $40_i$, the processed signal is fed to the loudspeaker $12_i$. Accordingly, even if the magnitude of the additive signal is limited for the psychoacoustical reason, the individual processing type echo cancellers $40_1$, $40_2$, ..., $40_M$ can each directly utilize the additive signal information buried in the received signal in the prior art, thereby improving the echo cancellation capabilities.

The additive signal fit for the configuration of FIG. 5 is required to have a property which uses the advantage of individual handling of the received signal $x_i(k)$ and the additive signal $a_i(k)$. That is, when the additive signal $a_i(k)$ contains, in large amounts, components highly correlated to the received signal $x_i(k)$, the processing results signal remains affected by the received signal $x_i(k)$ even if the additive signal is processed separately of the latter. Hence, it is desirable to minimize the correlation between the set of received signals $x_1(k)$ to $x_N(k)$ of all the receive channels and the set of additive signals $a_1(k)$ to $a_N(k)$ of all the channels. To meet this requirement, signals which have low correlations (close to zero) to the received signals of all the channels are generated in all the receive channels, and these low-correlated signals are used as the additive signals.

When the additive signals of all the channels are highly cross-correlated, it is considered that the echo cancellation capabilities could not fully be improved for the same reasons as is conventionally given when the received signals are highly cross-correlated. Hence, an alternative to the use of the above low-correlated signals is the use of low-correlated signals which have a low (or substantially no) correlation to the received signals of all the channels and are low cross-correlated to each other(close to zero).

Generation of Additive Signals

Next, a description will be given of a method for generating the low cross-correlated additive signals. Let an ordinary speech signal be represented by x(k) and an expectation by $$E[x^2(k)] = \sum_{k=1}^{K} x^2(k)/K \qquad (3)$$

Since the following equation approximately holds for the expectation $$E[x^2(k)]|_{x(k)>0} = E[x^2(k)]|_{x(k)<0} \qquad (4)$$

the speech signal x(k) and its absolute value |x(k)| are approximately uncorrelated, that is, the following equation approximately holds for an arbitrary time difference n.

$$E[x(k)|x(k-n)|]=0 \qquad (5)$$

Accordingly, letting i,j=1, 2, . . . , N represent the numbers given to the respective receive channels, the received signal $x_i(k)$ of each receive channel and its absolute value signal $|x_i(k)|$ are low correlated to each other. When the received signals $x_i(k)$ and $x_j(k)$ of two given receive channels (i≠j) are highly cross-correlated, their absolute value signals $|x_i(k)|$ and $|x_j(k)|$ are also highly cross-correlated, but it is considered that the correlation between the received signal $x_i(k)$ of any receive channel and the absolute value signal $|x_j(k)|$ of any other receive channel is low. Hence, $\alpha_i x_i(k)|$ is generated using a tuning parameter $\alpha_i$ for each receive channel, and is used as the low cross-correlated signal, i.e. as the additive signal. For a quick convergence of adaptive filter coefficients, the tuning parameter $\alpha_i$ may preferably be set as large as possible within the range over which an additive signal component in the acoustic signal radiated from the loudspeaker will not be offensive to the ear.

Additive Signal Generating Method (1)

When the received signals $x_1(k)$ to $x_N(k)$ are highly cross-correlated, it is considered that the aforementioned low cross-correlated signals $\alpha_i|x_i(k)|$ become highly cross-correlated, resulting in limitations being imposed on the improvement in the echo cancellation capabilities. To avoid this, Method (1) produces low cross-correlated signals by: producing an absolute value signal of the received signal in each receive channel; detecting the zero-crossing point that is a point in time when the sign of the original received signal changes; then giving a positive or negative sign to the absolute value signal simultaneously with the detection of the zero-crossing point by a rule different for each receive channel; and multiplying the signed absolute value signal by a tuning parameter.

The positive or negative sign can be given to the absolute value signal by such a method as described below. That is, a count is taken of zero-crossing points in one receive channel, and the sign is reversed at the zero-crossing point for each predetermined count value C. By this rule the sign is similarly reversed in all the other receive channels at thei zero-crossing point whenever a predetermined count values C are reached which differ among the receive channels. In this case, C is an integer equal to or greater than 2, and assume that C=0 means that the sign is fixed. With this scheme, even if the respective received signals $x_1(k)$ to $x_N(k)$ are highly cross-correlated, the cross-correlation between the additive, signals becomes low.

FIGS. 6A through 6D depict examples of absolute value signals signed by the rule described above. Shown in FIG. 6A is the original signal, which reverses in sign upon each zero crossing; hence, C=1. FIG. 6B depicts its absolute value signal, which does not change in sign; hence, C=0. With C=2, the sign reverses every two zero crossings as shown in FIG. 6C, and when C=3, the sign reverses every three zero crossings as shown in FIG. 6D. It will be seen that the signals depicted In FIGS. 6A through 6D, including the original signal, are uncorrelated. The value C will hereinafter be referred to as a sign reversal period.

Additive Signal Generating Method (2)

Another method for generating low cross-correlated signals will be described below. This method produces low cross-correlated additive signals by: extracting absolute value signals from the received signals in the respective receive channels; and multiplying the absolute value signal of only one of the receive channels by a non-zero tuning parameter and each of the absolute value signals of the other receive channels by a zero tuning parameter. The receive channel in which the absolute value signal is multiplied by the non-zero tuning parameter is selected by switching all the receive channels periodically or randomly with the lapse of time, or giving priority to that one of the receive channels in which the signal level is high. With this scheme, since the effective additive signal is always provided to only one receive channel, it is considered that the generation of an accurate echo replica takes more time than does Method (1), but since the additive signals in the other receive channels are zero, the computational complexity could be reduced.

As described above, according to the present invention, the additive signals, which are added to the respective received signals to vary or reduce the cross-correlation between the multi-channel received signals, can be used to estimate echo replicas, independently of their addition to the received signals; therefore, it is possible to generate accurately estimated echo replicas through effective utilization of uncorrelated components contained in the additive signals.

Individual Processing Type Echo Canceller

Figure 7:
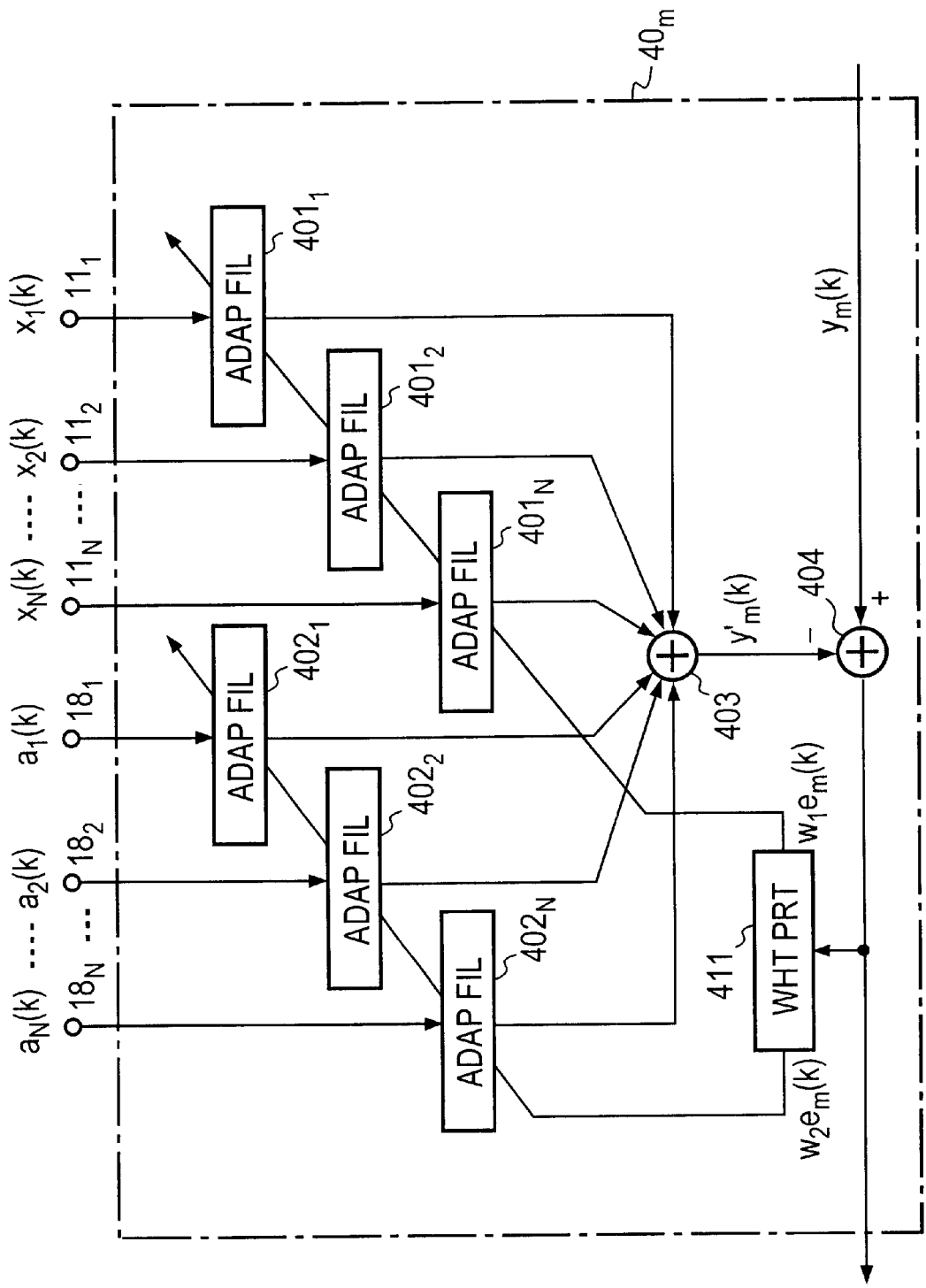
FIG. 7 is a block diagram illustrating an example of the functional configuration of an individual processing type echo canceller $40_m$ in FIG. 5.

FIG. 7 illustrates in block form an embodiment of the individual processing type echo canceller $40_m$ (where m=1, 2, . . . , M) in FIG. 5. In the illustrated configuration, the received signals $x_1(k)$ to $x_N(k)$ from the received signal terminals $11_1, 11_2, \ldots, 11_N$ are input into received-signal adaptive filters $401_1, 401_2, \ldots, 401_N$, respectively. In the present invention, additive-signal adaptive filters $402_1$ to $402_N$ are provided corresponding to the receive channels, respectively. The additive signals $a_1(k)$ to $a_N(k)$ at output terminals $18_1, 18_2, \ldots, 18_N$ of the additive signal generating parts $301_1$ to $301_N$ are fed into the adaptive filters $402_1, 402_2, \ldots, 402_N$, respectively. The sum total of outputs from the adaptive filters $401_1$ to $401_N$ and $402_1$ to $402_N$ are obtained by an adder 403 and is provided therefrom as the echo replica $y_m'(k)$. The echo replica $y_m'(k)$ is provided to a subtractor 404, wherein it is subtracted from the acoustic echo $y_m(k)$ picked up by the microphone $16_m$, thereby performing echo cancellation. In this and subsequent embodiments, an error signal $e_m(k)$ which is obtained by subtracting the echo replica $y_m'(k)$ from the acoustic echo $y_m(k)$ is weighted with two appropriate weighting coefficients $w_1$ and $w_2$ in a weighting part 411 to generate two weighted error signals $w_1 e_m(k)$ and $w_2 e_m(k)$, which are applied to the adaptive filters $401_1$ to $401_N$ and the adaptive filters $402_1$ to $402_N$, respectively. Based on the weighted error signals $w_1 e_m(k)$ and $w_2 e_m(k)$ and the input signals $x_1(k)$ to $x_N(k)$ and $a_1(k)$ to $a_N(k)$, the adaptive filters $401_1$ to $401_N$ and $402_1$ to $402_N$ calculate, for the filter coefficients currently set therein, filter coefficient vectors which will minimize the error signal $e_m(k)$ by the well-known NLMS algorithm or the like. The adaptive filters each update its filter coefficients with the thus calculated filter coefficient vector, getting ready for the next input. A concrete method for updating the filter coefficients will be described later on.

The error signals that are fed back to the received-signal adaptive filters $401_1$ to $401_N$ and the additive-signal adaptive filters $402_1$ to $402_N$ are weighted, for example, by giving the small weighting coefficient $w_1$ for each receive signal of large power and the large weighting coefficient $w_2$ for each additive signal of small power.

In the generation of the echo replica by the individual processing type echo canceller shown in FIG. 7, such different weighting of the information about the received signal and the information about the additive signal provides an advantage that the accuracy of the echo replica can be controlled. In practice, the additive signal needs to be adjusted such that when the processed signal produced by adding the additive signal to the received signal is radiated as an acoustic signal from the loudspeaker in FIG. 5 the additive signal components in the radiated acoustic signal may not be offensive to the ear. In many cases, the additive signals are smaller than the received signals. In such an instance, the above-mentioned weighting permits effective utilization of the information on the small additive signal. With the basic configuration of the present invention, however, the weighting coefficients $w_1$ and $w_2$ may be equal in FIG. 7. That is, the weighting part 411 may be dispensed with, in which case the error signal $e_m(k)$ is provided intact to the adaptive filters $401_1$ to $401_N$ and $402_1$ to $402_N$. The same is true of the modifications of the invention described later on.

Echo Canceller Modification 1

Figure 8:
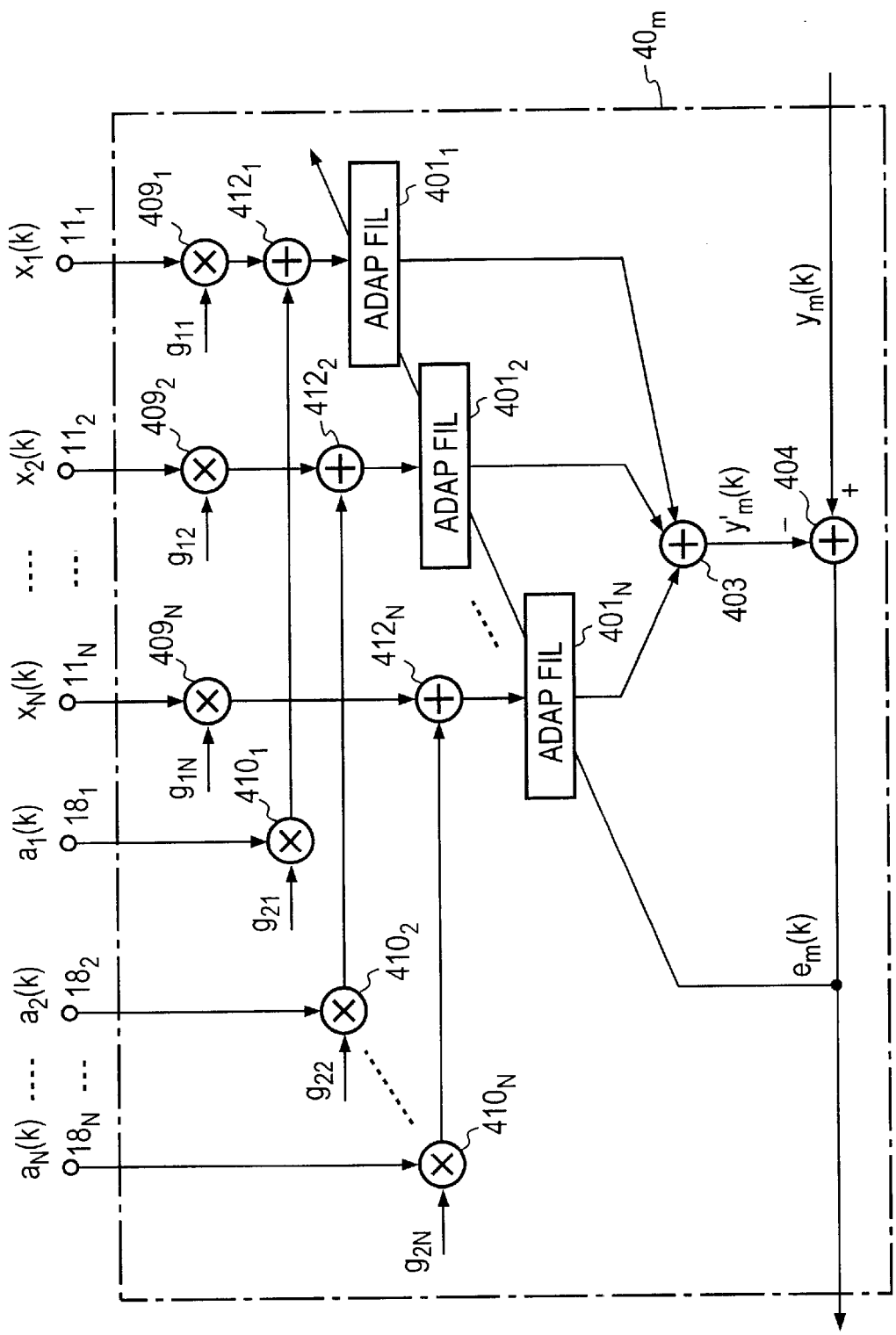
FIG. 8 is a block diagram illustrating another example of the functional configuration of the individual processing type echo canceller $40_m$ in FIG. 5.

FIG. 8 illustrates in block form a modification of the individual processing type echo canceller of FIG. 7 which is applied as the N-channel echo canceller $40_m$ (where m=1, . . . , M) in FIG. 5. In the embodiment of FIG. 7, the received-signal adaptive filters $401_1$ to $401_N$ and the additive-signal adaptive filters $402_1$ to $402_N$ are provided separately of each other in each N-channel echo canceller $40_m$ so that the received signals and the additive signals are processed independently of each other. It is also possible, however, to employ such a configuration as depicted in FIG. 8 wherein the additive signals $a_1(k)$ to $a_N(k)$ and the received signals $x_1(k)$ to $x_N(k)$ are combined in pairs after being processed separately of each other and the resulting N combined signals $x''_1(k)$ to $x''_N(k)$ are processed by the N adaptive filters $401_1$ to $401_N$.

That is, as shown in FIG. 8, the received signals $x_1(k)$ to $x_N(k)$ are multiplied by gain coefficients $g_{11}$ to $g_{1N}$ in multipliers $409_1$ to $409_N$, respectively, from which multiplied outputs $g_{11}x_1(k)$ to $g_{1N}x_N(k)$ are provided. The additive signals $a_1(k)$ to $a_N(k)$ are also similarly multiplied by gain coefficients $g_{21}$ to $g_{2N}$ in multipliers $410_1$ to $410_N$, respectively, from which multiplied outputs $g_{21}a_1(k)$ to $g_{2N}a_N(k)$ are provided. The gain coefficients $g_{21}$ to $g_{2N}$ for the additive signals are chosen greater than the gain coefficients $g_{11}$ to $g_{1N}$ for the received signals of the corresponding receive channels. The multiplied outputs are added together by adders $412_1$ to $412_N$ corresponding to the receive channels. The adder outputs are input as N combined processed signals $\{g_{11}x_1(k)+g_{21}a_1(k)\}$, $\{g_{12}x_2(k)+g_{22}a_2(k)\}$, . . . , $\{g_{1N}x_N(k)+g_{2N}x_N(k)\}$ into the N adaptive filters $401_1$ to $401_N$, respectively.

The outputs from the adaptive filters $401_1$ to $401_N$ are added together by the adder 403. The adder output is provided as the echo replica $y'_m(k)$ to the subtractor 404 for subtraction from the acoustic echo $y_m(k)$ to obtain the error $e_m(k)$. The adaptive filters $401_1$ to $401_N$ are updated their filter coefficients based on the error $e_m(k)$ and the combined processed signals $\{g_{11}x_1(k)+g_{21}a_1(k)\}$, $\{g_{12}x_2(k)+g_{22}a_2(k)\}$, . . . , $\{g_{1N}x_N(k)+g_{2N}x_N(k)\}$ from the adders $412_1$ to $412_N$.

What is important in the e$_m$bodiment of FIG. 8 is that the level ratio of the additive signal component $g_{2n}a_n(k)$ (where n=1, . . . , N) to the received signal component $g_{1n}x_n(k)$ of each combined processed signal is higher than the level ratio of the additive signal $a_n(k)$ to the received signal $x_n(k)$ which are components of the processed signal $x'_n(k)$ from each loudspeaker $12_n$. That is, the level of the additive signal component $a_n(k)$ in the acoustic signal from the loudspeaker $12_m$ is made low to such an extent as not to be offensive to the ear. On the other hand, the level of the additive signal component $g_{2n}a_n(k)$, which is the uncorrelated signal in the combined processed signal $\{g_{1n}x_n(k)+g_{2n}a_n(k)\}$, is made sufficiently high. This permits quick convergence of the filter coefficient of the adaptive filter $401_n$.

Echo Canceller Modification 2

Figure 9:
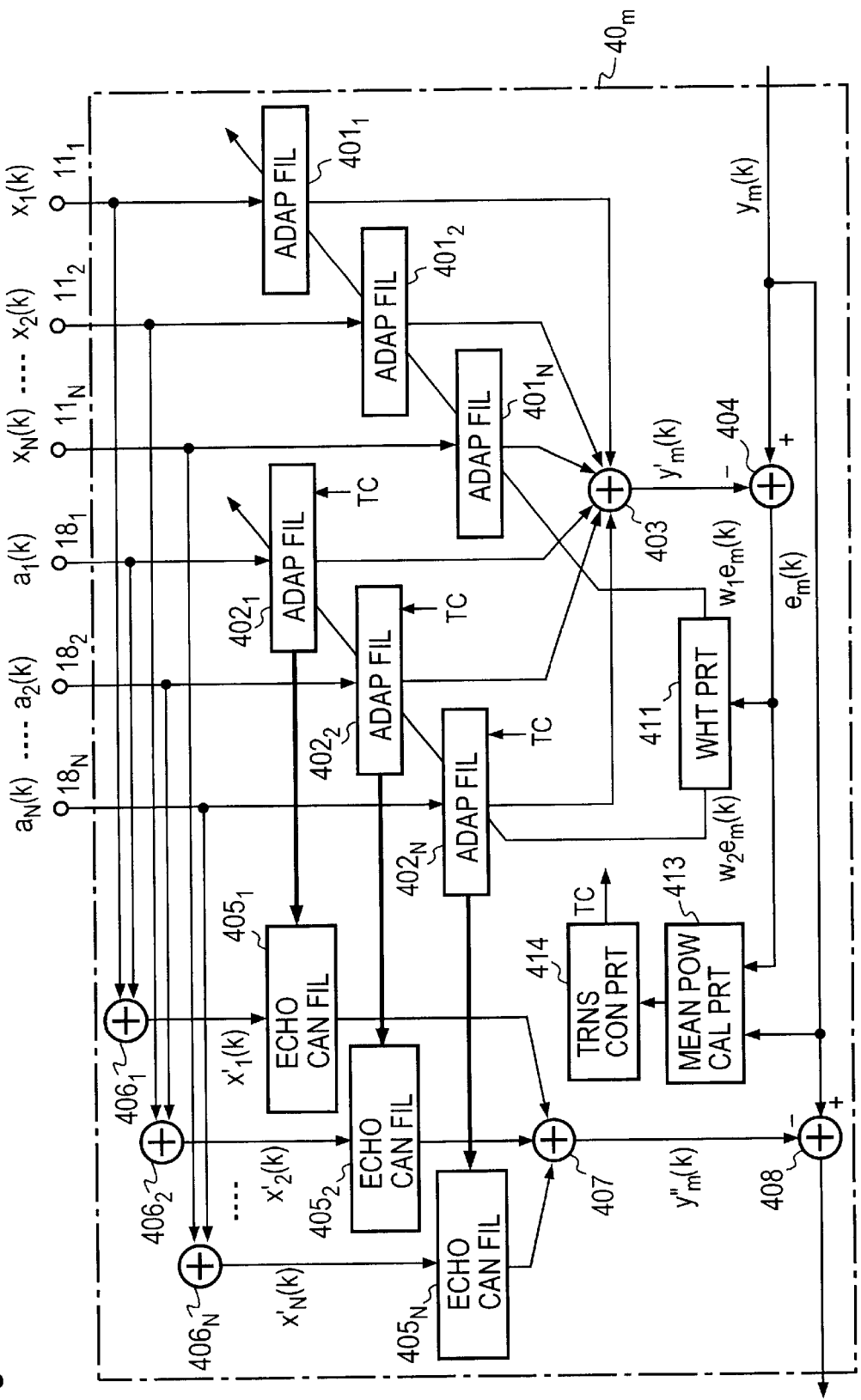
FIG. 9 is a block diagram illustrating another example of the functional configuration of the individual processing type echo canceller $40_m$ in FIG. 5.

FIG. 9 depicts another modified form of the individual processing type echo canceller $40_m$ described above with reference to FIG. 7. As is the case with the above, the received-signal adaptive filters $401_1, 401_2, \ldots, 401_N$ and the additive-signal adaptive filters $402_1, 402_2, \ldots, 402_N$ corresponding to all the receive channels are provided for each send channel. The received signals and additive signals of the respective channels are applied to the adaptive filters corresponding thereto, and the sum total $y'_m(k)$ of their outputs is obtained by the adder 403. The output $y'_m(k)$ from the adder 403 is subtracted from the acoustic echo $y_m(k)$ picked up by the microphone $16_m$ to obtain the error signal $e_m(k)$. In the weighting part 411 the error signal $e_m(k)$ is weighted with different weighting coefficients $w_1$ and $w_2$ to generate the weighted error signals $w_1e_m(k)$ and $w_2e_m(k)$, the former being provided to the adaptive filters $401_1$ to $401_N$ and the latter to the adaptive filters $402_1$ to $402_N$. Based on the signals $w_1e_m(k)$ and $w_2e_m(k)$ fed thereto, the adaptive filters $401_1$ to $401_N$ and $402_1$ to $402_N$ update their filter coefficients by the NLMS algorithm or the like algorithm to be ready for the next input. In this embodiment, the error signal $e_m(k)$ is used only to determine the filter coefficients of the adaptive filters $401_1$ to $401_N$ and $402_1$ to $402_N$, and is not directly used for echo cancellation.

This embodiment further comprises: adders $406_1$ to $406_N$ for adding the received signals $x_1(k)$ to $x_N(k)$ and the additive signals $a_1(k)$ to $a_N(k)$ in the respective receive channels; echo cancellation filters $405_1$ to $405_N$ which are supplied with the added outputs from the adders $405_1$ to $406_N$, respectively; an adder 407 which adds together the outputs from the echo cancellation filters $405_1$ to $405_N$ to obtain an echo replica $y''_m(k)$; and a subtractor 408 which subtracts the echo replica $y''_m(k)$ from the echo $y_m(k)$ to obtain an echo-cancelled signal and provides it as the output from the send channel. The adders $406_1$ to $406_N$ add the received signals $x_1(k)$ to $x_N(k)$ and the additive signals $a_1(k)$ to $a_N(k)$ of the receive channels respectively corresponding thereto; the added outputs from the adders $406_1$ to $406_N$ are the same as the processed signals $x'_1(k)$ to $x'_N(k)$ that are added outputs from the adders $501_1$ to $501_N$ in FIG. 5. Accordingly, the processed signals $x'_1(k)$ to $x'_N(k)$, which are provided from the adders $501_1$ to $501_N$ in FIG. 5, may be applied directly to the echo cancellation filters $405_1$ to $405_N$ of each canceller $40_m$ (where m=1, . . . , M) without providing the adders $406_1$ to $406_N$. The same is true of the embodiments described later on.

Since the correlation between the additive signals $a_1(K)$ to $a_N(k)$ is usually lower than the correlation between the received signals $x_1(k)$ to $x_N(k)$, it is expected that the filter coefficients of the adaptive filters $402_1$ to $402_N$ converge more accurately and more quickly than the filter coefficients of the adaptive filters $401_1$ to $401_N$. Hence, in this embodiment, for example, when the power of the error signal $e_m(k)$ becomes sufficiently smaller than the power of the echo signal $y_m(k)$, it is judged that the filter coefficients of the adaptive filters $402_1$ to $402_N$ have converged to some extent, and the filter coefficients of the additive-signal adaptive filters $402_1$ to $402_N$ are transferred to the echo cancellation filters $405_1$ to $405_N$ for use as their filter coefficients.

To perform this, there are provided a short time mean power calculation part 413 and a transfer control part 414. The short time mean power calculation part 413 is supplied with the error signal $e_m(k)$ and the echo signal $y_m(k)$, and calculates their power mean values $Pe_m(k)$ and $Py_m(k)$, for example, over a predetermined time length within one frame period. These values are fed to the transfer control part 414, which calculates the ratio between them, $Pe_m(k)/Py_m(k)$, as a condition for the transfer of the filter coefficients of the adaptive filters $402_1$ to $402_N$. The transfer control part 414 makes a check to see if the above-mentioned ratio is below a predetermined value (¼, for instance). When the condition is met, the transfer control part 414 applies a transfer control signal TC to the adaptive filters $402_1$ to $402_N$ to control them to transfer their filter coefficients to the echo cancellation filters $405_1$ to $405_N$. In this way, the short time mean power calculation part 413 always calculates the ratio $Pe_m(k)/Py_m(k)$, and only when the above-mentioned transfer condition is satisfied, the transfer control part 414 allows the adaptive filters $402_1$ to $402_N$ to transfer their filter coefficients to the echo cancellation filters $405_1$ to $405_N$. If necessary, it is also possible to add another transfer condition that the sum total of the received signal levels, for example, the sum total of the short time mean power values of all the received signals is greater than a predetermined value.

The outputs from the echo cancellation filters $405_1$ to $405_N$ are added together by the adder 407 to obtain the echo replica $y''_m(k)$. The subtractor 408 subtracts the echo replica $y''_m(k)$ from the acoustic echo $y_m(k)$, and provides an echo-cancelled signal accordingly.

Echo Canceller Modification 3

Figure 10:
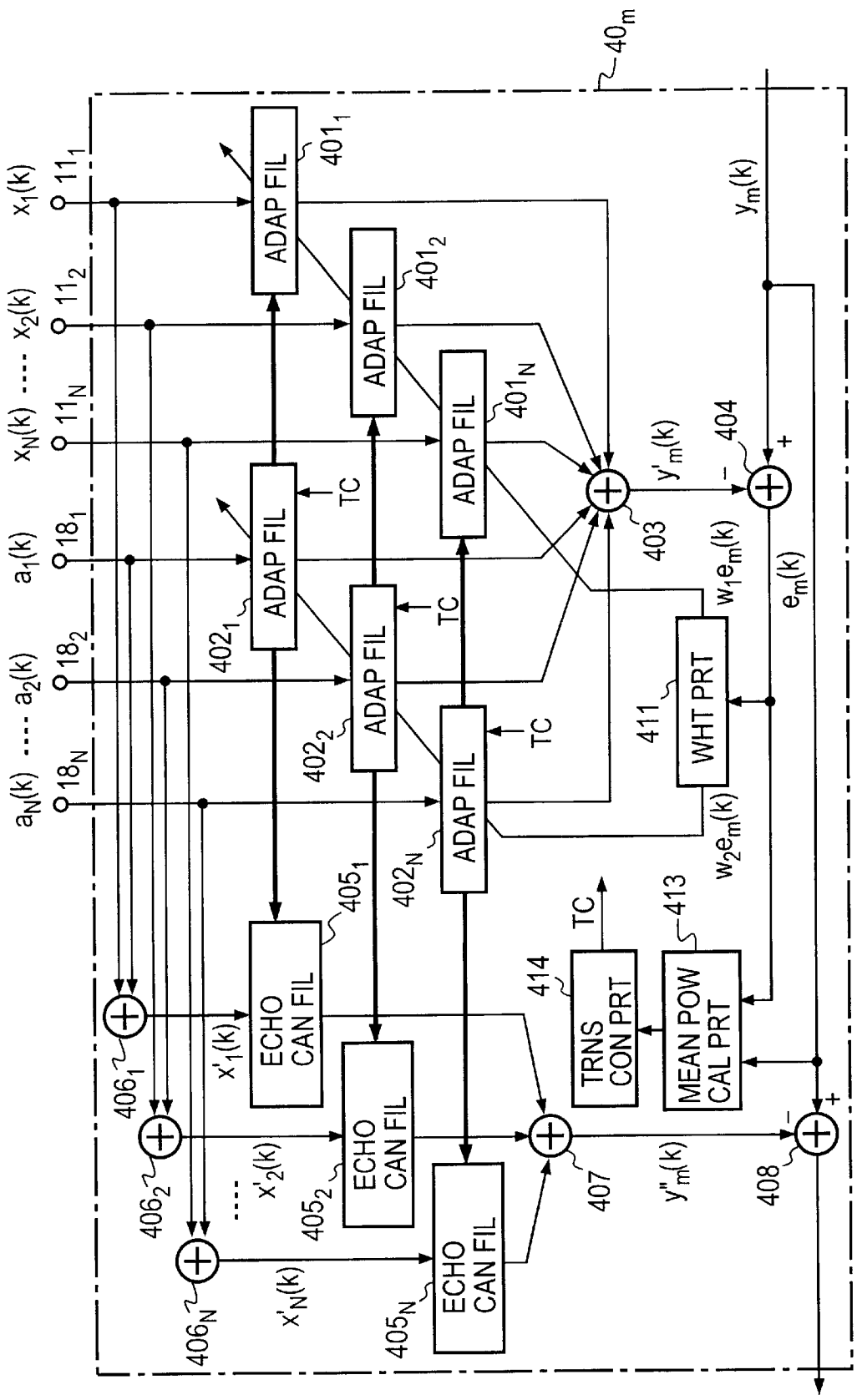
FIG. 10 is a block diagram illustrating another example of the functional configuration of the individual processing type echo canceller $40_m$ in FIG. 5.

FIG. 10 illustrates in block form another embodiment of the individual processing type echo canceller $40_m$ shown in FIG. 5. As described above, in the embodiment of FIG. 9, the coefficients of the additive-signal adaptive filters which are expected to quickly converge are transferred to the echo cancellation filters. By this, the echo replica $y''_m(k)$ which are generated by the echo cancellation filters can be made to approach the echo $y_m(k)$ in a shorter time than in the case of the FIG. 7 embodiment. That is, the echo cancellation effect can be produced in a shorter time. It is presumed that, at the same elapsed time point k from the start of the filter processing, the filter coefficients of the additive-signal adaptive filters $402_1$ to $402_N$ approximate true echo path impulse responses $h_1(k), h_2(k), \ldots, h_N(k)$ with higher accuracy than the filter coefficients of the received-signal adaptive filters $401_1$ to $401_N$. In other words, since the filter coefficients of the adaptive filters $401_1$ to $401_N$ and $402_1$ to $402_N$ are calculated by an adaptive algorithm based on the error $e_m(k)$ between the sum total $y'_m(k)$ of their outputs and the echo $y_m(k)$, it is considered that the filter coefficients of the received-signal adaptive filters $401_1$ to $401_N$ contribute to errors in the filter coefficients of the additive-signal adaptive filters $402_1$ to $402_N$ currently obtained. Hence, the embodiment of FIG. 10 is configured so that the additive-signal adaptive filter coefficients of high accuracy are transferred to the received-signal adaptive filters as well.

The echo canceller $40_m$ of FIG. 10 is provided for each send channel as depicted in FIG. 5. As is the case with the FIG. 9 embodiment, the adaptive filters $401_1$ to $401_N$ and $402_1$ to $402_N$ provided individually for the received signals and the additive signals are supplied with the received signals $x_1(k)$ to $x_N(k)$ and the additive signals $a_1(k)$ to $a_N(k)$ respectively corresponding thereto, and the sum total $y'_m(k)$ of the outputs from the adaptive filters is obtained. The sum total $y'_m(k)$ thus obtained is subtracted from the acoustic echo $y_m(k)$ picked up by the microphone to obtain the error signal $e_m(k)$. The error signal $e_m(k)$ is weighted with the different weighting coefficients $w_1$ and $w_2$ in the weighting part 411 to generate the weighted error signals $w_1 e_m(k)$ and $w_2 e_m(k)$. These weighted error signals are fed back to the adaptive filters $401_1$ to $401_N$ and $402_1$ to $402_N$ to update their filter coefficients, making them ready for the next input.

In the actual echo cancellation, the coefficients of the additive-signal adaptive filters are transferred to the echo cancellation filters 403, to $403_N$ corresponding thereto, respectively, then the sum of the received signal and the additive signal is input into the echo cancellation filters for each receive channel, and the sum total of their outputs is obtained as the echo replica $y''_m(k)$, which is subtracted from the acoustic echo $y_m(k)$, thereby implementing the echo cancellation. Since the coefficients of the additive-signal adaptive filters are also transferred to the received-signal adaptive filters $401_1$ to $401_N$ simultaneously with their transfer to the echo cancellation filters $405_1$ to $405_N$, the accuracy of the adaptive filters can be enhanced in their entirety.

The condition for the transfer of the coefficients may ti the same as in the embodiment of FIG. 9. That is, based on the power $Pe_m(k)$ of the error signal and the power $Py_m(k)$ of the acoustic echo calculated in the short time mean power calculation part 413, the transfer control part 414 makes a check to determine if the transfer condition is met; if the condition is satisfied, the transfer control part 414 provides the transfer control signal TC to the adaptive filters $402_1$ to $402_N$, from which their filter coefficients are transferred to both of the adaptive filters $401_1$ to $401_N$ and $405_1$ to $405_N$. In this modification, the received-signal adaptive filters $401_1$ to $401_N$ continue updating with the filter coefficients transferred thereto.

Echo Canceller Modification 4

Figure 11:
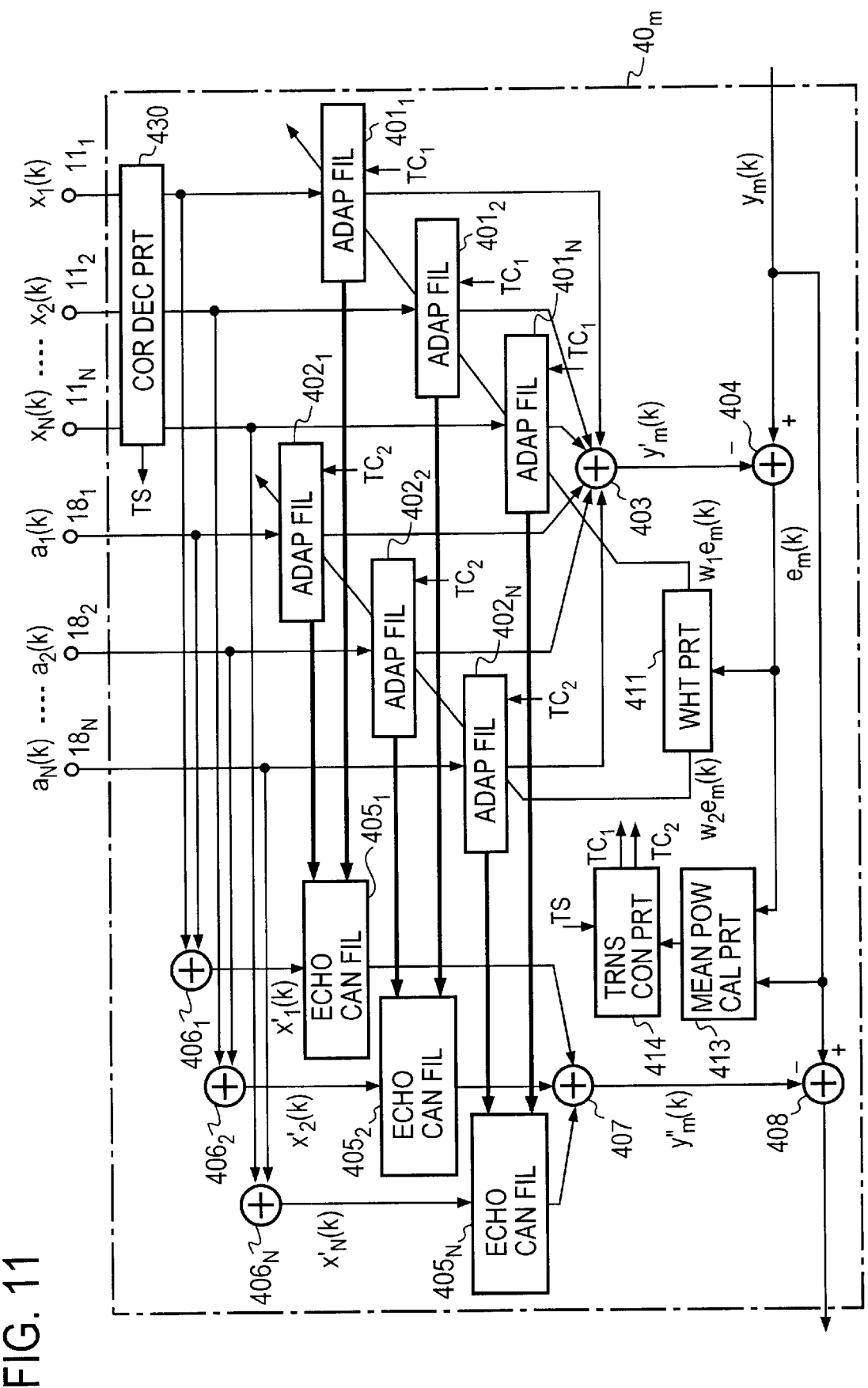
FIG. 11 is a block diagram illustrating another example of the functional configuration of the individual processing type echo canceller $40_m$ in FIG. 5.

FIG. 11 illustrates in block form another modified form of the individual processing type echo canceller depicted in FIG. 5. In the FIG. 9 embodiment the coefficients of the additive-signal adaptive filters $402_1$ to $402_N$ are transferred to the echo cancellation filters $405_1$ to $405_N$. This is based on the premise that the coefficients of the adaptive filters $402_1$ to $402_N$, which are supplied with low-correlation additive signals, converge more quickly and more accurately than the filter coefficients of the received-signal adaptive filters $401_1$ to $401_N$ because the received signals $x_1(k)$ to $x_N(k)$ are usually highly correlated. In practice, however, the received signals $x_1(k)$ to $x_N(k)$ are not always highly correlated. In the case where signals from a plurality of entirely different sound sources are provided as multi-channel received signals, the correlation between them may sometimes become sufficiently low. In such an instance, it is expected that the coefficients of the received-signal adaptive filters quickly converge with high accuracy. In view of this, in this embodiment the maximum correlation among the received signals $x_1(k)$ to $x_N(k)$ is determined. If the maximum correlation is higher than a predetermined value, the coefficients of the additive-signal adaptive filters are transferred to the echo cancellation filters as in the FIG. 9 embodiment. When the maximum correlation is lower than the predetermined value, the coefficients of the received-signal adaptive filters. are transferred to the echo cancellation filters.

In the echo canceller $40_m$ of FIG. 11, the adaptive filters $401_1$, to $401_N$ and $402_1$ to $402_N$ are provided in the respective send channels as depicted in FIG. 5. As in the FIG. 9 embodiment, they are supplied with the received signals $x_1(k)$ to $x_N(k)$ and the additive signals $a_1(k)$ to $a_N(k)$ corresponding thereto. The sum total $y'_m(k)$ of the outputs from all the adaptive filters is obtained by the adder 403. The adder output $y'_m(k)$ is subtracted from the acoustic echo $y_m(k)$ picked up by the microphone to obtain the error signal $e_m(k)$. The error signal $e_m(k)$ is weighted with the weighting coefficients $w_1$ and $w_2$ in the weighting part 411. The resulting weighted error signals $w_1 e_m(k)$ and $w_2 e_m(k)$ are fed back to the adaptive filters $401_1$ to $401_N$ and $402_1$ to $402_N$ to update their coefficients, making them ready for the next input.

This embodiment differs from the FIG. 9 embodiment in such a point as described below. That is, in the actual echo cancellation, the correlation between two out of the received signals $x_1(k)$ to $x_N(k)$ for every combination thereof is detected in a correlation decision part 430. When the maximum value of the correlation between the received signals is higher than a predetermined value, the correlation decision part 430 applies a transfer selection control signal TS to the transfer control part 414 so that the coefficients of the additive-signal adaptive filters $402_1$ to $402_N$ are transferred to the echo cancellation filters $405_1$ to $405_N$ into which the processed signals $x'_1(k)$ to $x'_N(k)$ are input. When the maximum correlation among the received signals is lower than the predetermined value, the correlation decision part 430 sends the transfer selection control signal TS to the transfer control part 414 so that the coefficients of the received-signal adaptive filters $401_1$ to $401_N$ are transferred to the echo cancellation filters $405_1$ to $405_N$. In the case of transferring the coefficients of the additive-signal adaptive filters $402_1$ to $402_N$ in response to the transfer selection control signal TS, the transfer control part 414 provides a transfer control signal $TC_2$ to the adaptive filters $402_1$ to $402_N$. In the case of transferring the coefficients of the received-signal adaptive filters $401_1$ to $401_N$, the transfer control part 414 sends thereto a transfer control signal $TC_1$. In the respective receive channels, the processed signals $x'_1(k)$ to $x'_N(k)$, which are the sums of the received signals $x_1(k)$ to $x_N(k)$ and the additive signals $a_1(k)$ to $a_N(k)$, are input into the echo cancellation filters $405_1$ to $405_N$ with the transferred filter coefficients set therein. The sum total $y''_m(k)$ of the outputs from the echo cancellation filters $405_1$ to $405_N$ is obtained as an echo replica, which is subtracted from the acoustic echo $y_m(k)$ to achieve the intended echo cancellation.

The method of this embodiment is aimed to provide improved echo cancellation capabilities through utilization of the fact that since the received signals, in general, are higher in level than the additive signals, when the correlations among the received signals $x_1(k)$ and $x_N(k)$ are low, estimated coefficients of the received-signal adaptive filters would be more are accurate as compared with the additive-signal adaptive filters.

Echo Canceller Modification 5

Figure 12:
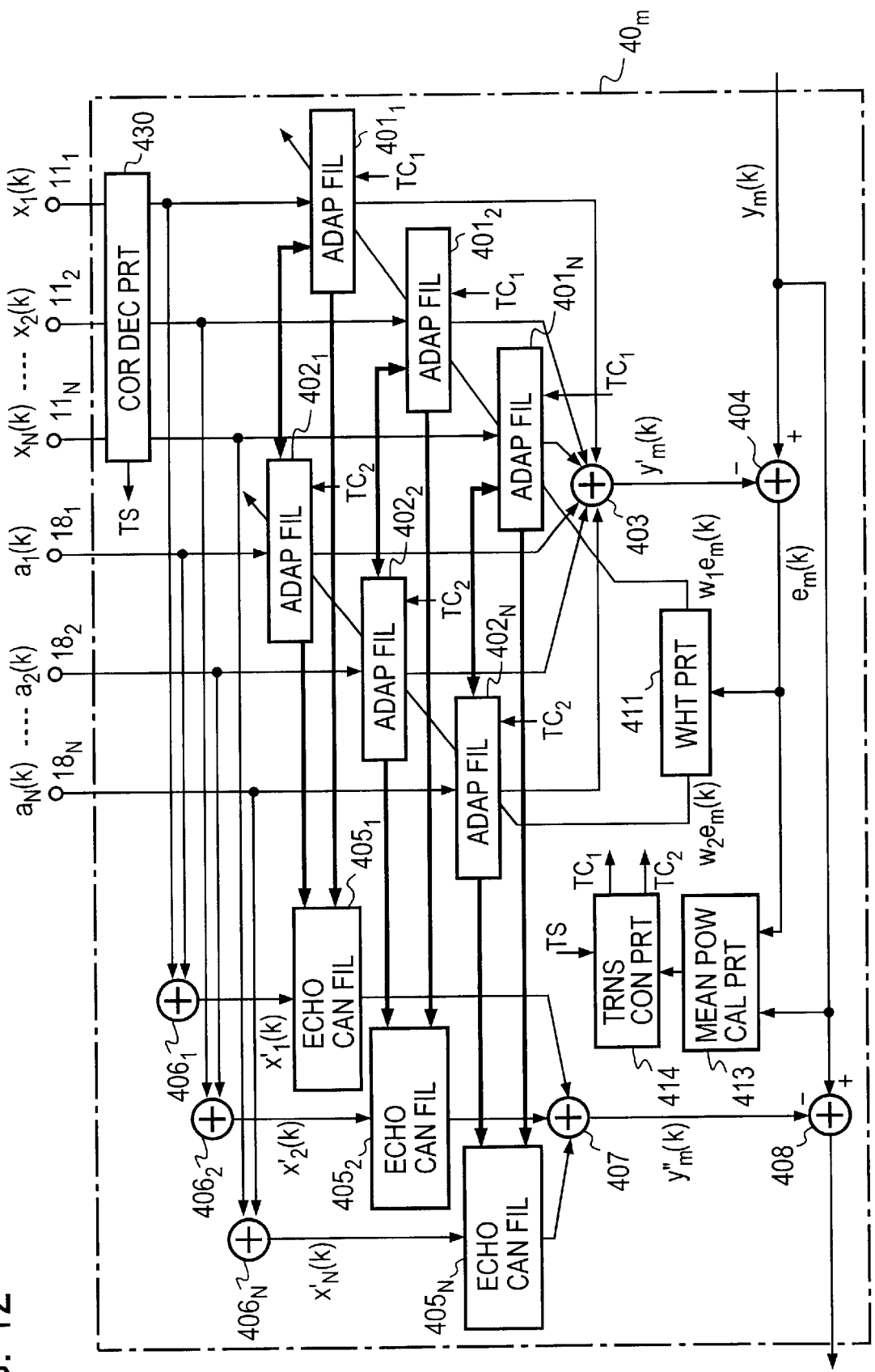
FIG. 12 is a block diagram illustrating still another example of the functional configuration of the individual processing type echo canceller $40_m$ in FIG. 5.

FIG. 12 illustrates in block form still another configuration of the individual processing type echo canceller. In this configuration, as is the case with the FIG. 9 embodiment, the received signals $x_1(k)$ to $x_N(k)$ and the additive signals $a_1(k)$ to $a_N(k)$ are input into the adaptive filters $401_1$ to $401_N$ and $402_1$ to $402_N$ respectively corresponding thereto. The sum total $y'_m(k)$ of the outputs from all the adaptive filters is subtracted from the acoustic echo $y_m(k)$ picked up by the microphone to obtain the error signal $e_m(k)$. The error signal $e_m(k)$ is weighted with the weighting coefficients $w_1$ and $w_2$ in the weighting part 411. The resulting weighted error signals $w_1 e_m(k)$ and $w_2 e_m(k)$ are fed back to the adaptive filters $401_1$ to $401_N$ and $402_1$ to $402_N$ to update their coefficients, making them ready for the next input.

This embodiment differs from the FIG. 9 embodiment in such a point as described below. In the actual echo cancellation, the correlation between the received signals $x_1(k)$ to $x_N(k)$ is detected in a correlation decision part 430. When the correlation between the received signals is high, the correlation decision part 430 applies the transfer selection control signal TS to the transfer control part 414 so that the coefficients of the additive-signal adaptive filters $402_1$ to $402_N$ are transferred to the received-signal adaptive filters $401_1$ to $401_N$ and echo cancellation filters $405_1$ to $405_N$ into which the processed signals are input. When the correlation between the received signals is low, the correlation decision part 430 sends the transfer selection control signal TS to the transfer control part 414 so that the coefficients of the received-signal adaptive filters $401_1$ to $401_N$ are transferred to both of the echo cancellation filters $405_1$ to $405_N$ and the additive-signal adaptive filters $402_1$ to $402_N$.

In the case of transferring the coefficients of the additive-signal adaptive filters $402_1$ to $402_N$ in response to the transfer selection control signal TS when the transfer condition is satisfied, the transfer control part 414 provides the transfer control signal $TC_2$ to the adaptive filters $402_1$ to $402_N$. In the case of transferring the coefficients of the received-signal adaptive filters $401_1$ to $401_N$, the transfer control part 414 sends thereto the transfer control signal $TC_1$. The processed signals $x'_1(k)$ to $x'_N(k)$, which are the sums of the received signals $x_1(k)$ to $x_N(k)$ and the additive signals $a_1(k)$ to $a_N(k)$, are input into the echo cancellation filters $405_1$ to $405_N$ in the respective receive channels. The sum total $y''_m(k)$ of the outputs from the echo cancellation filters $405_1$ to $405_N$ is obtained as an echo replica, which is subtracted from the acoustic echo $y_m(k)$ to achieve the intended echo cancellation. This embodiment not only possesses the advantages of the both embodiments described above with reference to FIGS. 10 and 11 but also permits the transfer of the filter coefficients from the received-signal adaptive filters to the additive-signal ones, ensuring higher accuracy of the filter coefficients.

Figure 13:
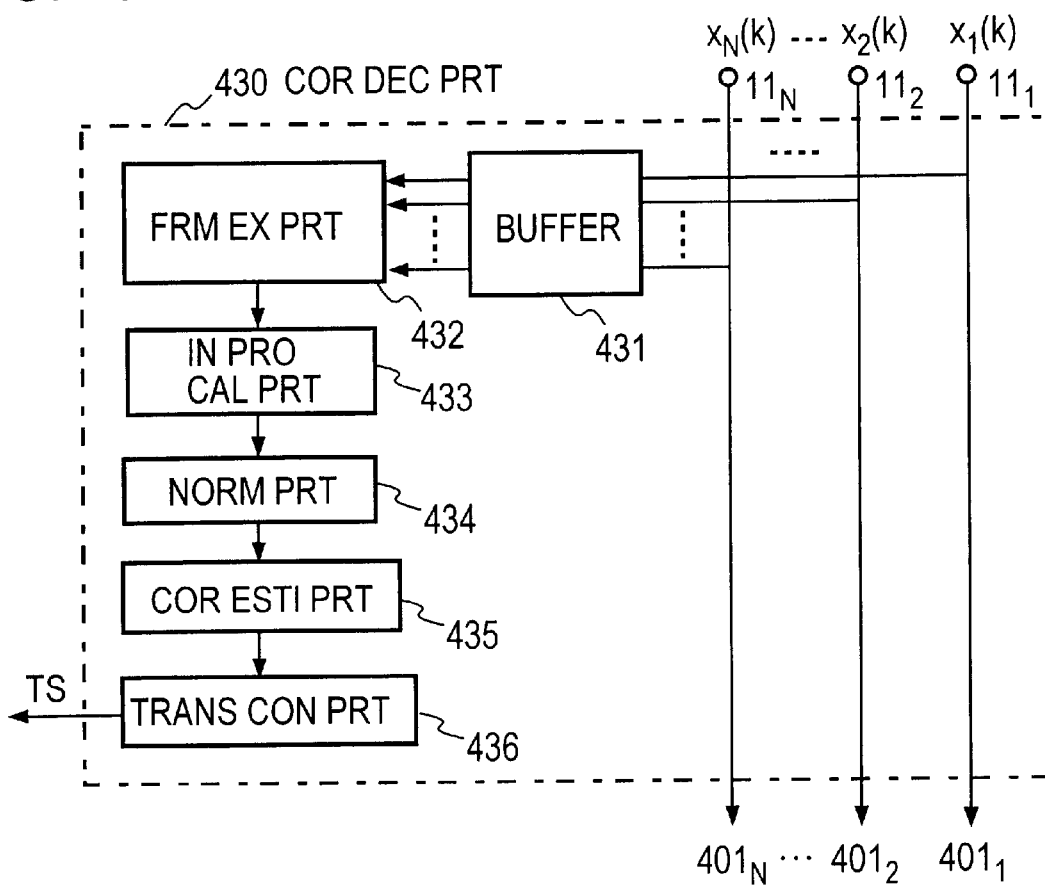
FIG. 13 is a block diagram depicting an example of the functional configuration of a correlation decision part 430 in FIGS. 11 and 12.

FIG. 13 illustrates in block form an example of the configuration of the correlation decision part 430 for use in the embodiments of FIGS. 11 and 12. The correlation decision part 430 is to evaluate the cross-correlation on between the received signals of the respective channels for sample points in a frame width corresponding to the number L of taps of the adaptive filter. In a buffer 431 there are always stored signal samples of the received signals $x_1(k)$ to $x_N(k)$ of, for instance, the past two frame lengths (extending over the current point in time k, k−1, . . . , k−L+1, k−L, . . . , K−2L+1). A frame extraction part 432 extracts, as a vector $x_n(k)$ (where n=1, 2, . . . , N) for each receive channel, a received signal sequence composed of the past L continuous samples $x_n(k)$, $x_n(k-1)$, . . . . , $x_n(k-L+1)$ from the received signal stored in the buffer 431. An inner product calculation part 433 selects, from all the channels, two channels to be evaluated (hereinafter identified by n=i and n=j), and calculates the inner product of their signal sequence vectors, for example, $x_i(k)$ and $x_j(k)$. A normalization part 434 divides the calculation result $x_i^T(k) \cdot x_j(k)$ by the magnitude of the two signal sequence vectors to be evaluated, thereby obtaining an evaluation value $E_C$ which is given, for example, by the following equation:

$$E_C = \underset{i \neq j}{\text{MAX}} \frac{x_i^T(k) \cdot x_j(k)}{(\|x_i(k)\| \cdot \|x_j(k)\|)} \tag{6}$$

With this equation (6), however, no appropriate evaluation value could be obtained even for the signals that are highly cross-correlated when they are shifted in time. Hence, received signals are evaluated by calculating the above cross-correlation evaluation value $E_C$ whenever the time k of the one vector, for example, $x_i(k)$ is shifted to k−1, k−2, . . . , k−L up to, for example, one frame. A correlation evaluation part 435 compares the cross-correlation evaluation values $E_C$ thus calculated for all combinations of the received signals in all the channels, and adopts the maximum one of the values as the evaluation value of the entire system. When the evaluation value $E_C$ on the cross-correlation between at least one pair of received signals is larger than a predetermined value, a transfer selection part 436 decides that the coefficients of the additive-signal adaptive filters 402$_1$ to 402$_N$ will converge with higher accuracy than the coefficients of the received-signal adaptive filters 401$_1$ to 401$_N$. In this instance, the transfer selection part 436 provides the transfer selection signal TS to the transfer control part 414 to transfer the coefficients of the adaptive filters 402$_1$ to 402$_N$ to the other filters 401$_1$ to 401$_N$ and 405$_1$ to 405$_N$. When the evaluation value $E_C$ is not larger than the predetermined value, the transfer selection part 435 applies the transfer selection signal to the transfer control part 414 to transfer the coefficients of the received-signal adaptive filters 401$_1$ to 401$_N$ to the other filters 402$_1$ to 402$_N$ and 405$_1$ to 405$_N$.

Embodiment by Computer

Figure 14:
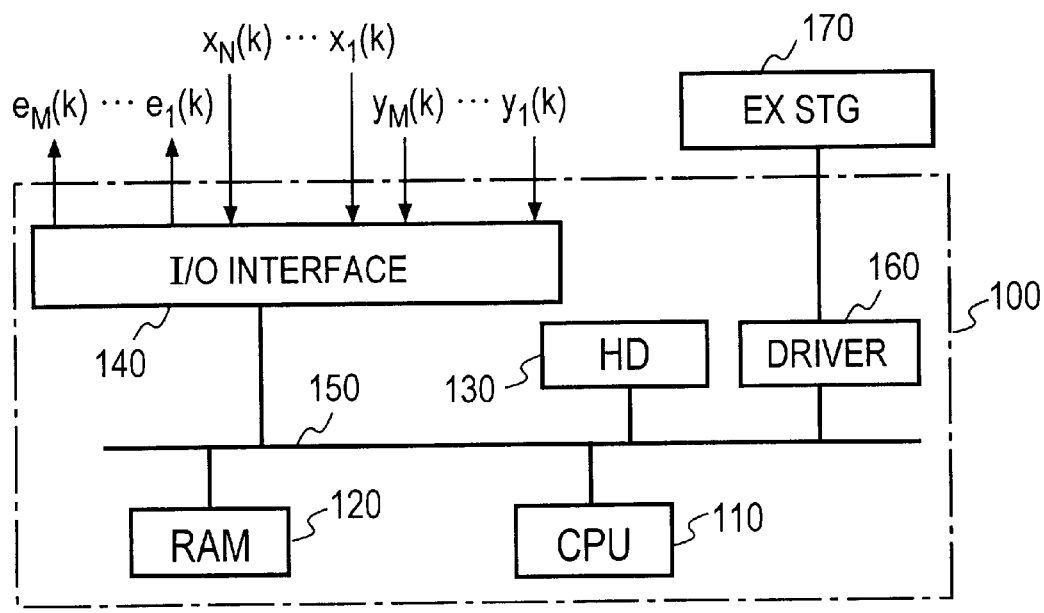
FIG. 14 is a block diagram illustrating a system configuration for implementing the present invention by a computer.

The multi-channel acoustic echo canceller according to the present invention described above may be realized, for example, by a computer which implements its respective parts through data processing of the received signals $x_1(k)$ to $x_N(k)$ and the acoustic echoes $y_1(k)$ to $y_M(k)$ from the microphones. In this instance, processing of each part depicted in the above-described embodiments is described as a program, and is prestored on a recording medium so that it is read out therefrom, as required, for execution by the computer. FIG. 14 depicts an example of such a computer configuration. A computer denoted generally by 100 in FIG. 14, which operates as the acoustic echo canceller, is a computer of a typical configuration, wherein a CPU 110, RAM 120, a hard disk 130, an I/O interface 140, and so on are interconnected via a bus 150. The program for the echo cancellation according to the present invention is prestored, for instance, on the hard disk 130. During operation the program is read into the RAM 120, and the CPU 110 follows the program to execute processing. The received signals $x_1(k)$ to $x_N(k)$ and the echoes $y_1(k)$ to $y_M(k)$ from the microphones are input into the computer 100 via the I/O interface 140 and subjected to the afore-mentioned processing for echo cancellation, echo-cancelled residual or error signals $e_1(k)$ to $e_M(k)$ being output via the I/O interface 140. The program for echo cancellation may be prestored on an external storage 170 so that it is read out therefrom and into the RAM 120 by a driver 160 of the storage 170.

Example of Two-Channel System

Figure 15:
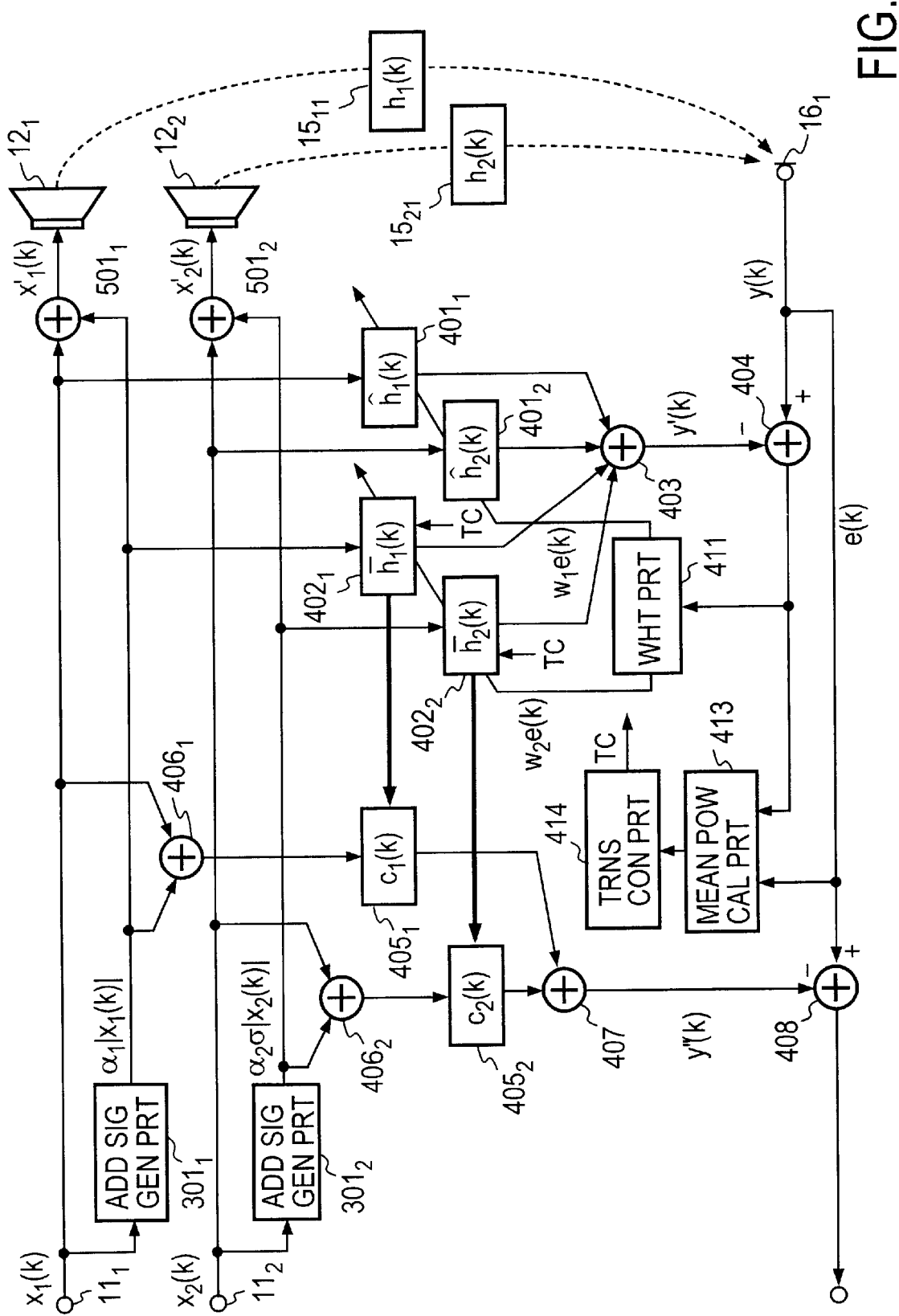
FIG. 15 is a block diagram depicting the functional configuration of an example of the present invention applied to a two-channel acoustic echo canceller.

FIG. 15 illustrates in block form the multi-channel echo canceller of FIG. 9 configured as a two-receive-one-send-channel system. The additive signal generation, the adaptive filter operation and the error weighting in this system will be described in more detail. In FIG. 15 the parts corresponding to those in FIGS. 5 and 9 are identified by the same reference numerals.

"Additive Signal Generation"

The additive signals for the received signals $x_1(k)$ and $x_2(k)$ of two channels are generated. Let $\sigma_C$ represent a sign coefficient that provides a sign reversal each time the count value C of zero-crossing points is reached, where C is the sign reversal interval. In this case, $\sigma_C=1$ or −1. For the receive channel 1, the sign reversal interval C is set at 0 to fix the sign, and the tuning coefficient is set at $\alpha_1$ to obtain an additive signal $\alpha_1|x_1(k)|$. For the receive channel 2, the sign reversal period C is set at 2 to switch the value of the sign coefficient $\sigma_C$ between 1 and −1 upon each detection of two zero-crossing points of the received signal $x_2(k)$, and the tuning coefficient is set at $\alpha_2$ to obtain an additive signal $\alpha_2 \sigma_C|x_2(k)|$. When the sign reversal period C is 2, it is also possible to switch the sign at the timing when the sign of the signal $x_2(k)$ changes from positive to negative or vice versa, instead of counting the number of zero-crossing points.

"Adaptive Filter Operation"

To facilitate a better understanding of the operation of the adaptive filter, signals will be described as being vectorized. That is, received signal vectors will be represented by $\underline{x}_1(k)$ and $\underline{x}_2(k)$ and additive signal vectors as $\alpha_1 \underline{\bar{x}}_1(k)$ and $\alpha_2 \underline{\bar{x}}_2(k)$, where $$x_1(k)=[x_1(k), x_1(k-1), \ldots, x_1(k-L+1)]^T, \tag{7}$$

$$x_2(k)=[x_2(k), x_2(k-1), \ldots, x_2(k-L+1)]^T, \tag{8}$$

$$\bar{x}_1(k)=[|x_1(k)|, |x_1(k-1)|, \ldots, |x_1(k-L+1)|]^T, \tag{9}$$

$$\bar{x}_2(k)=[\sigma_C|x_2(k)|, \sigma_C x_2(k-1)|, \ldots, \sigma_C|x_2(k-L+1)|]^T \tag{10}$$

and T indicates a transpose operation of vector. In the above, L is the number of taps of each adaptive filter. The coefficient vectors of the adaptive filters 401$_1$ and 401$_2$, which are supplied with $x_1(k)$ and $x_2(k)$, will hereinafter be represented by $\hat{h}_1(k)$ and $\hat{h}_2(k)$, respectively, and the coefficient vectors of the adaptive filters 402$_1$ and 402$_2$, which are supplied with $\alpha_1 \bar{x}_1(k)$ and $\alpha_2 \bar{x}_2(k)$, will be represented by $\hat{\bar{h}}_1(k)$ and $\hat{\bar{h}}_2(k)$, respectively. And, impulse responses that are transfer characteristics between two loudspeakers and two microphones will hereinafter be modeled as vectors, $h_1(k)$ and $h_2(k)$, of L-length true acoustic echo paths.

In the first place, acoustic echoes y(k) that sneak into the microphones from the two loudspeakers can be expressed as follows:

$$y(k)=\{x_1^T(k)+\alpha_1 \bar{x}_1^T(k)\}h_1(k)+\{x_2^T(k)+\alpha_2 \bar{x}_2^T(k)\}h_2(k) \tag{11}$$

$$=x_1^T(k)h_1(k)+\bar{x}_2^T(k)h_2(k)+\alpha_1 x_1^T(k)h_1(k)+\alpha_2 \bar{x}_2^T(k)h_2(k) \tag{12}$$

The adaptive filters 401$_1$, 401$_2$, 402$_1$ and 402$_2$ each calculate a replica $\hat{y}(k)$ as follows:

$$\hat{y}(k)=x_1^T(k)\hat{h}_1(k)+x_2^T(k)\hat{h}_2(k)+\alpha_1 \bar{x}_1^T(k)\hat{\bar{h}}_1(k)+\alpha_2 \bar{x}_2^T(k)\hat{\bar{h}}_2(k) \tag{13}$$

From Eqs. (12) and (13), the coefficient vectors of the respective adaptive filters need to converge as follows:

$$\hat{h}_1(k) \rightarrow h_1(k) \tag{14}$$

$$\hat{h}_2(k) \rightarrow h_2(k) \tag{15}$$

$$\hat{\bar{h}}_1(k) \rightarrow h_1(k) \tag{16}$$

$$\hat{\bar{h}}_2(k) \rightarrow h_2(k) \tag{17}$$

Hence, ideally $$\hat{\bar{h}}_1(k)=\hat{h}_1(k), \hat{\bar{h}}_2(k)=\hat{h}_2(k)$$

In many cases, however, the received signal vectors $x_1(k)$ and $x_2(k)$ are highly correlated with each other, and since the two receive channels affect each other as in the prior art, the coefficient vectors $\hat{h}_1(k)$ and $\hat{h}_2(k)$ do not quickly converge. On the other hand, since $\alpha_1 \bar{x}_1(k)$ and $\alpha_2 \bar{x}_2(k)$ are low in correlation to each other and to the received signal vectors $x_1(k)$ and $x_2(k)$, the convergence of the coefficients $\bar{h}_1(k)$ and $\bar{h}_2(k)$ is not affected by the signals of other channels. That is, it is considered that at least the coefficients $\bar{h}_1(k)$ and $\bar{h}_2(k)$ converge with high accuracy. Accordingly, even if y'(k) is used as an echo replica, improvement in performance can be expected to some extent. But, to prevent the coefficient vectors $\hat{h}_1(k)$ and $\hat{h}_2(k)$ from affecting the generation of the echo replica, the accurate coefficients $\bar{h}_1(k)$ and $\bar{h}_2(k)$ are transferred as coefficient vectors to the echo cancellation filters 405$_1$ and 405$_2$, respectively, then the outputs $x_1(k)+\alpha_1 \bar{x}_1(k)$ and $x_2(k)+\alpha_2 \bar{x}_2(k)$ from the adders 406$_1$ and 406$_1$ are input into the echo cancellation filters 405$_1$ and 405$_2$, respectively, and an echo replica is provided as the sum of their outputs from the adder 407. This provides increased accuracy of the echo replica. In the following description, $\hat{h}_1(k)$ and $\hat{h}_2(k)$ will be referred to as first estimated echo path impulse responses in correspondence to the true impulse responses $h_1(k)$ and $h_2(k)$ of the echo paths 15$_{11}$ and 15$_{12}$ from the loudspeakers 12$_1$ and 12$_2$ to the microphone 16$_1$. And $\bar{h}_1(k)$ and $\bar{h}_2(k)$ will hereinafter be referred to as second estimated echo path impulses responses. Further, the adaptive filters 401$_1$ and 401$_2$ will be called first estimated echo paths and the adaptive filters 402$_1$ and 402$_2$ second estimated echo paths.

Error Weighting

A description will be given of a method by which the error e(k) between the acoustic echo y(k) and the adaptive filter output y(k) is weighted with different weighting coefficients in the weighting part 414 prior to the feedback for updating the coefficient of each adaptive filter.

Now, assume that the adaptive filter coefficient vectors $\hat{h}_1(k)$, $\hat{h}_2(k)$ and $\bar{h}_1(k)$, $\bar{h}_2(k)$ are updated by the NLMS algorithm as follows:

$$\begin{bmatrix} \hat{h}_1(k+1) \\ \hat{h}_2(k+1) \\ \bar{h}_1(k+1) \\ \bar{h}_2(k+1) \end{bmatrix} = \begin{bmatrix} \hat{h}_1(k) \\ \hat{h}_2(k) \\ \bar{h}_1(k) \\ \bar{h}_2(k) \end{bmatrix} + \frac{\mu e(k)}{(1+\alpha^2)(\|x_1(k)\|^2 + \|x_2(k)\|^2)} \begin{bmatrix} x_1(k) \\ x_2(k) \\ \alpha \bar{x}_1(k) \\ \alpha \bar{x}_2(k) \end{bmatrix} \quad (18)$$

where the tuning coefficients are set such that $\alpha_1 = \alpha_2 = \alpha$. And $$e(k) = y(k) - y'(k)$$

and $\mu$ is a parameter called step size. Setting $\mu=1$ in Eq. (18) and multiplying its both sides from the left by $$[x_1^T(k), x_2^T(k), \alpha \bar{x}_1^T(k), \alpha \bar{x}_2^T] \quad (19)$$

it follows that $$y(k) = y'(k) + \frac{e(k)}{1+\alpha^2} + \frac{\alpha^2 e(k)}{1+\alpha^2} = y'(k) + e(k) \quad (20)$$

That is, by applying again the input signal at time k to the adaptive filters after updating, the error signal e(k) is compensated for and the sum total of the ououts from the adaptive filters becomes equal to y(k). The above indicates that the second and third terms in the middle of Eq. (20) are obtained from the sum of inner products given by the following equation which is obtained by multiplying the second term on the right side of Eq. (18) by Eq. (19) from the left-hand side:

$$\frac{e(k)}{(1+\alpha^2)(\|x_1(k)\|^2 + \|x_2(k)\|^2)} \{x_1(k) \cdot x_1^T(k) + x_2(k) \cdot x_2^T(k)\} + \quad (21)$$

$$\{\alpha \bar{x}_1(k) \cdot \alpha \bar{x}_1^T(k) + \alpha \bar{x}_2(k) \cdot \alpha \bar{x}_2^T(k)\}$$

Further, it can be seen that the second term in the middle of Eq. (20) represents the compensation by the coefficient vectors $\hat{h}_1(k+1)$ and $\hat{h}_{2(K+2)}$ of the adaptive filters supplied with the received signals $x_1(k)$ and $x_2(k)$, and that the third term in the middle represents the compensation by the coefficient vectors $\bar{h}_1(k+1)$ and $\bar{h}_2(k+1)$ of the adaptive filters supplied with the additive signals $\alpha_1 \bar{x}_1(k)$ and $\alpha_2 \bar{x}_2(k)$. Usually, the value $\alpha$ is chosen small, for example, about 0.2. Hence, it will be understood that Eq. (18) performs updating that puts a higher premium on the coefficient vectors $\hat{h}_1(k+1)$ and $\hat{h}_2(k+1)$ susceptible to the correlation between the received signal than the coefficient vectors $\bar{h}_1(k+1)$ and $\bar{h}_2(k+1)$ which are expected to converge with high accuracy.

To solve this problem, the weighting part 411 multiplies the error e(k) by the different weighting coefficients $w_1$ and $w_2$ in the updating of the coefficient vectors $\hat{h}_1(k+1)$ and $\hat{h}_2(k+1)$ and in the updating of the coefficient vectors $\bar{h}_1(k+1)$ and $\bar{h}_2(k+1)$, respectively. That is, the adaptive filter coefficients are updated using the following equations.

$$\begin{bmatrix} \hat{h}_1(k+1) \\ \hat{h}_2(k+1) \end{bmatrix} = \begin{bmatrix} \hat{h}_1(k) \\ \hat{h}_2(k) \end{bmatrix} + \frac{\mu w_1 e(k)}{(1+\alpha^2)(\|x_1(k)\|^2 + \|x_2(k)\|^2)} \begin{bmatrix} x_1(k) \\ x_2(k) \end{bmatrix} \quad (22)$$

$$\begin{bmatrix} \bar{h}_1(k+1) \\ \bar{h}_2(k+1) \end{bmatrix} = \begin{bmatrix} \bar{h}_1(k) \\ \bar{h}_2(k) \end{bmatrix} + \frac{\mu w_1 e(k)}{(1+\alpha^2)(\|x_1(k)\|^2 + \|x_2(k)\|^2)} \begin{bmatrix} \alpha \bar{x}_1(k) \\ \alpha \bar{x}_2(k) \end{bmatrix} \quad (23)$$

This provides $$e(k) = (1/(1+\alpha^2)) w_1 e(k) + (\alpha^2/(1+\alpha^2)) w_2 e(k) \quad (24)$$

Then, setting, for example, $$w_1 = (1+\alpha^2)/2 \quad (25)$$

$$w_2 = (1+\alpha^2)/(2\alpha^2) \quad (26)$$

Eq. (24) becomes $$e(k) = (\frac{1}{2}) e(k) + (\frac{1}{2}) e(k) \quad (27)$$

The compensation represented by the first term on the right side by the adaptive filter coefficient vectors $\hat{h}_1(k+1)$ and $\hat{h}_2(k+1)$ for the received signals $x_1(k)$ and $x_2(k)$ and the compensation represented by the second term on the right side by the adaptive filter coefficient vectors $\bar{h}_1(k+1)$ and $\bar{h}_2(k+1)$ for the additive signals $\alpha_1 \bar{x}_1(k)$ and $\alpha_2 \bar{x}_2(k)$ are equal to each other. Furthermore, since $w_1$ and $w_2$ in Eqs. (25) and (26) are chosen such that $w_1:w_2=1:(1/\alpha^2)$, the error e(k) is weighted in inverse proportion to the power of the received signals $x_1(k)$ and $x_2(k)$ and the power of the additive signals $\alpha_1 \bar{x}_1(k)$ and $\alpha_2 \bar{x}_2(k)$.

With too small a tuning coefficient $\alpha$, if the weighting coefficients $w_1$ and $w_2$ are chosen such as given by Eqs. (25) and (26), the weighting coefficient $w_2$ may sometimes become so large that the calculation becomes unstable. This can be avoided by introducing a relaxation coefficient $\beta$ into the adaptive filter updating equations as follows:

$$\begin{bmatrix} \hat{h}_1(k+1) \\ \hat{h}_2(k+1) \end{bmatrix} = \begin{bmatrix} \hat{h}_1(k) \\ \hat{h}_2(k) \end{bmatrix} + \frac{\mu w_1 e(k)}{2(\|x_1(k)\|^2 + \|x_2(k)\|^2)} \begin{bmatrix} x_1(k) \\ x_2(k) \end{bmatrix} \quad (28)$$

$$\begin{bmatrix} \bar{h}_1(k+1) \\ \bar{h}_2(k+1) \end{bmatrix} = \begin{bmatrix} \bar{h}_1(k) \\ \bar{h}_2(k) \end{bmatrix} + \frac{\mu \beta w_2 e(k)}{2\alpha^2(\|x_1(k)\|^2 + \|x_2(k)\|^2)} \begin{bmatrix} \alpha \bar{x}_1(k) \\ \alpha \bar{x}_2(k) \end{bmatrix} \quad (29)$$

Figure 16A:
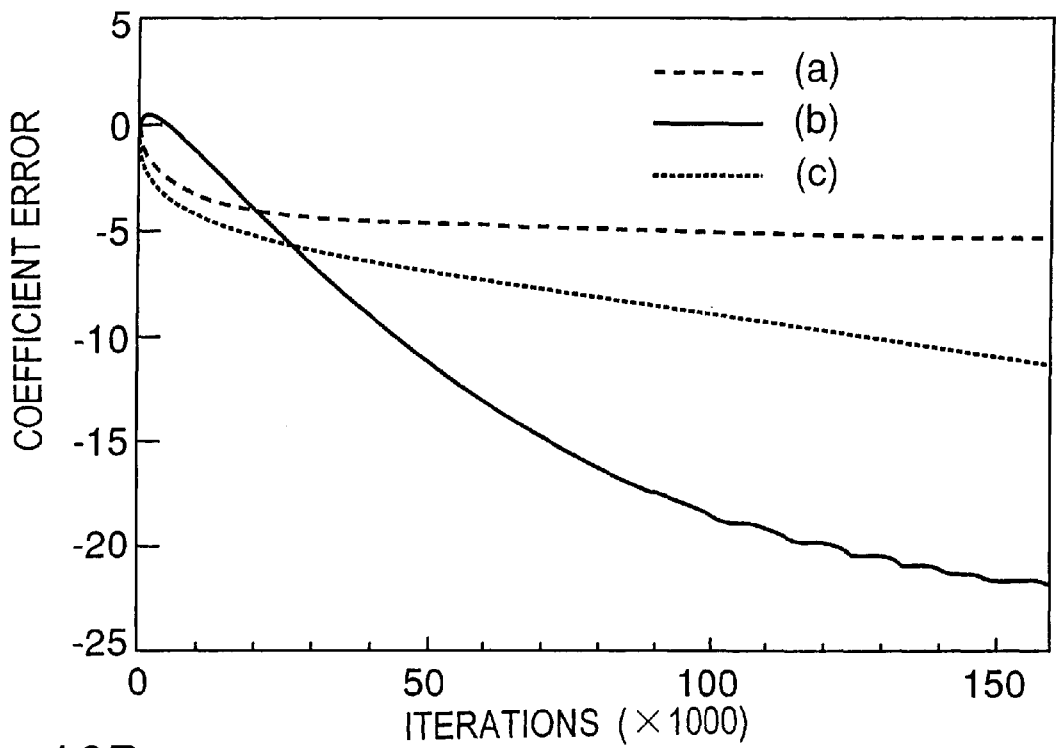
FIG. 16A is a graph showing simulation results for demonstrating the effectiveness of the present invention when the received signals are Gaussian white noise signals.
Figure 16B:
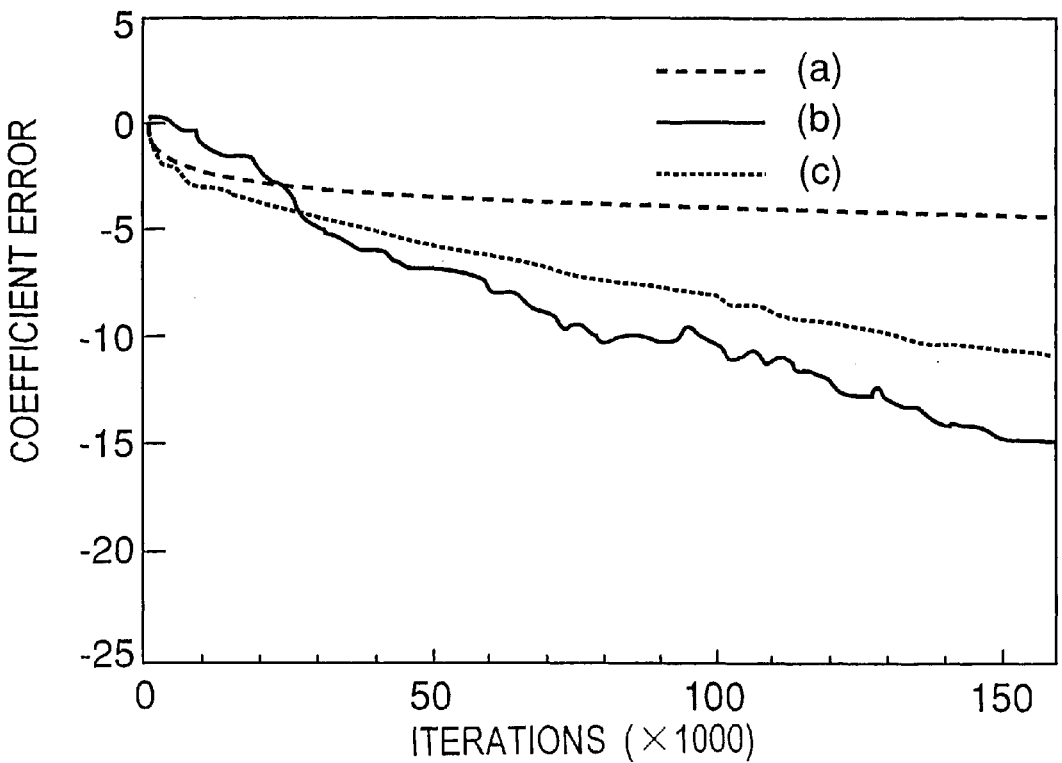
FIG. 16B is a graph showing simulation results for demonstrating the effectiveness of the present invention when the received signals are male speech signals.

In FIGS. 16A and 16B there are shown the results of computer simulations of updating of the adaptive filters by using Eqs. (28) and (29) when the cross-correlated inputs were Gaussian white noise and Japanese male speech, respectively. The curves (a) and (b) respectively show normalized square errors of coefficient vectors $\hat{h}_1(k)$, $\hat{h}_2(k)$ and $\bar{h}_1(k)$, $\bar{h}_2(k)$ according to the present invention from $h_1(k)$ and $h_2(k)$. The curve (c) shows normalized square errors of the adaptive filter coefficient vectors $\hat{h}_1(k)$ and $\hat{h}_2(k)$ from $h_1(k)$ and $h_2(k)$ in the prior art method when $x_1(k)+\alpha_1\bar{x}_1(k)$ and $x_2(k)+\alpha_2\bar{x}_2(k)$ were input. The parameters used were $\alpha=0.2$, $\beta=0.7$ and $\mu=0.5$; the adaptive filter length was 1000 taps; and noise was added to the acoustic echo so that the SN ratio would be 30 dB. From FIGS. 16A and 16B it will be seen that the convergence of $\bar{h}_1(k)$ and $\bar{h}_2(k)$ for the additive signals is excellent.

The present invention has been described as being applied to the echo cancellation in the teleconference system, but as described previously, the principle of the present invention is effective in cancelling a reproduced sound from a loudspeaker superimposed on a desired acoustic signal picked up by a microphone. Hence, the present invention is applicable to any echo canceller for an acoustic syste$_m$wherein a plurality of receive channels each containing a loudspeaker and at least one pickup channel containing a microphone for picking up a desired sound are placed in a common sound field, as long as the echo canceller is intended to cancel the reproduced sound from the loudspeaker picked up by the microphone.

Effect of the Invention

In the multi-channel acoustic echo cancellation method, the echo cancellation performance can be improved by the conventional pre-processing scheme of adding an additive signal to each of the received signals. However, the additive signals cannot be made large because of the psychoacoustical restriction. Furthermore, since the processed signal of each channel which is the sum of the received signal and the additive signal of the corresponding channel is used in the generation of the echo replica for echo cancellation, important information contained in the additive signal is buried in the received signal, limiting the improvement in the echo cancellation performance capabilities.

With the echo cancellation method according to the present invention, an appropriate additive signal is generated first, and then in the generation of the echo replica for echo cancellation, the additive signal and the received signal are individually subjected to adaptive filter processing instead of using the above-mentioned processed signal, so that the important information contained in the additive signal can easily be utilized. This enables accurate generation of the echo replica. Accordingly, the present invention improves the echo cancellation performance capabilities as compared with the conventional method.

What is claimed is:

1. A multi-channel acoustic echo cancellation method for an acoustic system which has N receive channels each containing a loudspeaker for generating a reproduced sound, N being an integer equal to or greater than 2, and at least one pickup channel containing a microphone for picking up an acoustic signal, said N loudspeakers and said microphone being placed in a common sound field, said method comprising the steps of:

(a) generating low cross-correlated additive signals for N received signals input into said N receive channels, respectively;

(b) adding said received signals of said N receive channels and said additive signals corresponding thereto to generate processed signals of said N receive channels;

(c) radiating said processed signals of said N receive channels by said loudspeakers corresponding thereto;

(d) picking up, by said microphone of said at least one pickup channel, a combined acoustic echo of the reproduced sounds sneaking thereinto from said loudspeakers of said N receive channels, and inputting the combined acoustic echo into said at least one pickup channel as an acoustic echo signal; and (e) individually processing said N received signals and said N additive signals to generate an echo replica that simulates said acoustic echo signal in said at least one pickup channel, and subtracting said echo replica from said acoustic echo signal to thereby perform acoustic echo cancellation.

2. The method of claim 1, wherein said step (e) comprises the steps of:

(e-1) inputting said received signals of said N receive channels into N first adaptive filters and inputting said additive signals respectively corresponding to said N receive channels into N second adaptive filters;

(e-2) calculating the sum total of the outputs from said N first adaptive filters and said N second adaptive filters to obtain said echo replica for said pickup channel;

(e-3) subtracting said echo replica for said pickup channel from said acoustic echo signal of said pickup channel to obtain an error while achieving the acoustic echo cancellation; and (e-4) feeding back said error to said N first adaptive filters and said N second adaptive filters to update their filter coefficients based on said error and said received signals and said additive signals of said N receive channels.

3. The method of claim 1, wherein said step (e) comprises the steps of:

(e-1) assigning gains $g_{11}$ to $g_{1N}$ to said received signals of said N receive channels;

(e-2) assigning gains $g_{21}$ to $g_{2N}$ to said additive signals corresponding to said N receive channels, said gains $g_{21}$ to $g_{2N}$ for said additive signals being chosen greater than said gains $g_{11}$ to $g_{1N}$ for said received signals of said receive channels corresponding thereto;

(e-3) adding said received signals assigned said gains and said additive signals assigned said gains in said receive channels corresponding thereto to generate N combined processed signals;

(e-4) inputting said N combined processed signals into N adaptive filters;

(e-5) calculating the sum total of the outputs from said N adaptive filters to obtain an echo replica corresponding to said acoustic echo signal of said pickup channel;

(e-6) subtracting said echo replica for said pickup channel from said acoustic echo signal thereof to obtain an error while achieving said acoustic echo cancellation; and (e-7) feeding back said error to said N adaptive filters to update their filter coefficients based on said error and said received signals of said N receive channels assigned said gains and said additive signals assigned said gains.

4. The method of claim 1, wherein said step (e) comprises the steps of:
(e-1) inputting said received signals of said N receive channels into N first adaptive filters and inputting said additive signals corresponding to said N receive channels into N second adaptive filters;
(e-2) calculating a sum total of the outputs from said N first adaptive filters and said N second adaptive filters for said pickup channel;
(e-3) subtracting said sum total for said pickup channel from said acoustic echo signal of said pickup channel to obtain an error;
(e-4) feeding back said error to said N first adaptive filters and said N second adaptive filters to update their filter coefficients based on said error and said received signals and said additive signals of said N receive channels;
(e-5) inputting said processed signals of said N receive channels into N echo cancellation filters corresponding thereto;
(e-6) transferring filter coefficients of said N second adaptive filters to said N echo cancellation filters of said receive channels corresponding thereto;
(e-7) calculating a sum total of the outputs from said N echo cancellation filters as an echo replica corresponding to said acoustic echo signal of said pickup channel; and
(e-8) subtracting said echo replica from said acoustic echo signal to thereby perform said acoustic echo cancellation.

5. The method of claim 4, wherein said step (e-6) comprises a step of transferring the filter coefficients of said N second adaptive filters corresponding to said N receive channels to said N first adaptive filters of the corresponding receive channels.

6. The method of claim 4, which further comprises a step of calculating the maximum value of the correlation between said received signals of all combinations of said N receive channels and deciding whether said maximum correlation value is larger or smaller than a predetermined value, and wherein said step (e-6) comprises a step of transferring the filter coefficients of said second adaptive filters to said echo cancellation filters corresponding thereto when said maximum correlation value is larger than said predetermined value, and transferring the filter coefficients of said first adaptive filters to said echo cancellation filters corresponding thereto when said maximum correlation value is smaller than said predetermined value.

7. The method of claim 4, which further comprises a step of calculating the maximum value of the correlation between said received signals of all combinations of said N receive channels and deciding whether said maximum correlation value is larger or smaller than a predetermined value, and wherein said step (e-6) comprises a step of transferring the filter coefficients of said second adaptive filters to both of said echo cancellation filters and said first adaptive filters corresponding to said second adaptive filters when said maximum correlation value is larger than said predetermined value, and transferring the filter coefficients of said first adaptive filters to both of said echo cancellation filters and said second adaptive filters corresponding to said first adaptive filters when said maximum correlation value is smaller than said predetermined value.

8. The method of claim 4, 5, 6, or 7, wherein said step (e-6) comprises a step of calculating the mean power of said acoustic echo signal and the mean power of said error of said pickup channel, and executing the transfer of said filter coefficients when the mean power of said error is decided to be sufficiently smaller than the mean power of said acoustic echo signal.

9. The method of claim 8, wherein when the ratio between the mean power of said error and the mean power of said acoustic echo signal is smaller than a predetermined value, the former is decided to be sufficiently smaller than the latter.

10. The method of any one of claims 1, 2, 3, 4, 5, 6 and 7, wherein said step (a) is a step of generating N low-correlated signals which have substantially no correlation to all of said received signals of said N receive channels, said N low-correlated signals being used as said additive signals.

11. The method of claim 10, wherein said low-correlated signal generating step is a step of generating said low-correlated signals by: calculating the absolute values of said received signals in said N receive channels; and multiplying them by predetermined tuning coefficients, respectively.

12. The method of claim 10, wherein said low-correlated signal generating step is a step of generating said low-correlated signals by: calculating the absolute value of said received signal in each of said N receive channels to obtain an absolute-value signal; counting zero-crossing points of said each received signal; for each predetermined count value different for each receive channel, alternately assigning positive and negative signs to said absolute-value signal of said each receive channel in synchronization with said zero-crossing point; and multiplying said absolute-value signal by a predetermined tuning coefficient.

13. The method of claim 10, wherein said low-correlated signal generating step comprises:
(a-1) calculating absolute values of said received signals in said N receive channels to produce N absolute-value signals corresponding to said N receive channels;
(a-2) selecting one of said N receive channels;
(a-3) multiplying a tuning coefficient of non-zero value by the absolute value signal corresponding to the selected receive channel and multiplying tuning coefficients of zeros by the absolute-value signals corresponding to those non-selected ones of said N receive channels;
(a-4) repeating the steps (a-1) to (a-3) every constant time interval to produce said N low-correlated signals corresponding to said N receive channels, respectively.

14. The method of any one of claims 2, 4, 5, 6 and 7, wherein said filter coefficient updating step is a step of updating the filter coefficients of said first and second adaptive filters by feeding back differently weighted versions of said error to a set of said N adaptive filters supplied with said N received signals as the inputs thereto and a set of said N second adaptive filters supplied with said N additive signals as the inputs thereto.

15. The method of claim 14, wherein said differently weighted versions of said error are obtained by assigning a small weighting coefficient to said received signal of large power and a large weighting coefficient to said additive signal of small power in each receive channel based on the difference in power between said received and additive signals.

16. The method of any one of claims 1, 2, 3, 4, 5, 6, and 7, wherein said received signals of said N receive channels are signals of N channels received from locations different from said sound field, and said error in said pickup channel is sent as a send signal to said different locations.

17. A multi-channel acoustic echo canceller for an acoustic syste$_m$which has N receive channels each containing a loudspeaker for generating a reproduced sound, N being an integer equal to or greater than 2, and at least one pickup channel containing a microphone for picking up an acoustic signal, said N loudspeakers and said microphone being placed in a common sound field, said echo canceller comprising:

N additive signal generating means for generating low cross-correlated additive signals for N received signals input into said N receive channels, respectively;

N processed signal generating means for adding said received signals of said N receive channels and said additive signals corresponding thereto to generate processed signals of said N receive channels;

said N loudspeakers each provided in one of said N receive channels, for reproducing said processed signals of said N receive channels and outputting reproduced sounds;

said microphone for picking up a combined acoustic echo of said reproduced sounds sneaking thereinto from said N loudspeakers, and for inputting into said at least one pickup channel the combined acoustic echo as an acoustic echo signal;

means for individually processing said N received signals and said N additive signals to generate an echo replica that simulates said acoustic echo signal in said at least one pickup channel, and for subtracting said echo replica from said acoustic echo signal to thereby perform acoustic echo cancellation.

18. The acoustic echo canceller of claim 17, wherein said processing and subtracting means comprises:

N first adaptive filters provided corresponding to said pickup channel and each supplied with one of said received signals of said N receive channels;

N second adaptive filters corresponding to said pickup channel and each supplied with one of said additive signals corresponding to said N receive channels;

adding means for calculating the sum total of the outputs from said N first adaptive filters and said N second adaptive filters and for outputting said sum total as said echo replica;

means for subtracting said echo replica from said acoustic echo signal of said pickup channel to obtain an error while achieving echo acoustic echo cancellation; and filter coefficient updating means for feeding back said error to said N first adaptive filters and said N second adaptive filters to update their filter coefficients based on said error and said received signals and said additive signals of said N receive channels.

19. The acoustic echo canceller of claim 17, wherein said processing and subtracting means comprises:

first multiplying means for assigning gains $g_{11}$ to $g_{1N}$ to said received signals of said N receive channels;

second multiplying means for assigning gains $g_{21}$ to $g_{2N}$ to said additive signals corresponding to said N receive channels, said gains $g_{21}$ to $g_{2N}$ for said additive signals being chosen greater than said gains $g_{11}$ to $g_{1N}$ for said received signals of said receive channels corresponding thereto;

combining means for adding said received signals assigned said gains and said additive signals assigned said gains in said receive channels corresponding thereto to obtain N combined processed signals;

N adaptive filters each supplied with one of said N combined processed signals;

adding means for calculating the sum total of the outputs from said N adaptive filters to obtain an echo replica corresponding to said acoustic echo signal of said pickup channel;

means for subtracting said echo replica for said pickup channel from said acoustic echo signal thereof to obtain an error while achieving the acoustic echo cancellation; and means for feeding back said error to said N adaptive filters to update their filter coefficients based on said error and said received signals of said N receive channels assigned said gains and said additive signals assigned said gains.

20. The acoustic echo canceller of claim 17, wherein said processing and subtracting means comprises:

N first adaptive filters provided corresponding to said pickup channel and each supplied with one of said received signals of said N receive channels;

N second adaptive filters corresponding to said pickup channel and each supplied with one of said additive signals corresponding to said N receive channels, respectively;

adding means for calculating a sum total of the outputs from said N first adaptive filters and said N second adaptive filters and for outputting said sum total;

means for subtracting said sum total from said acoustic echo signal of said pickup channel to obtain an error;

filter coefficient updating means for feeding back said error to said N first adaptive filters and said N second adaptive filters to update their filter coefficients based on said error and said received signals and said additive signals of said N receive channels;

N echo cancellation filters provided corresponding to said N receive channels and each supplied with said processed signal of the corresponding receive channel;

transfer control means for transferring filter coefficients of said N second adaptive filters to said N echo cancellation filters of said receive channels corresponding thereto;

means for calculating a sum total of the outputs from said N echo cancellation filters as an echo replica; and means for subtracting said echo replica from said acoustic echo signal of said pickup channel to thereby achieve said acoustic echo cancellation.

21. The acoustic echo canceller of claim 20, wherein said transfer control means transfers the filter coefficients of said N second adaptive filters corresponding to said N receive channels to said N first adaptive filters of the corresponding receive channels.

22. The acoustic echo canceller of claim 20, which further comprises correlation decision means for calculating the maximum value of the correlation between said received signals of all combinations of said N receive channels and for deciding whether said maximum correlation value is larger or smaller than a predetermined value, and wherein said transfer control means is means for transferring the filter coefficients of said second adaptive filters to said echo cancellation filters corresponding thereto when said maximum correlation value is larger than said predetermined value, and for transferring the filter coefficients of said first adaptive filters to said echo cancellation filters corresponding thereto when said maximum correlation value is smaller than said predetermined value.

23. The acoustic echo canceller of claim 20, which further comprises correlation decision means for calculating the maximum value of the correlation between said received signals of all combinations of said N receive channels and for deciding whether said maximum correlation value is larger or smaller than a predetermined value, and wherein said transfer control means is means for transferring the filter coefficients of said second adaptive filters to both of said echo cancellation filters and said first adaptive filters corresponding to said second adaptive filters when said maximum correlation value is larger than said predetermined value, and for transferring the filter coefficients of said first adaptive filters to both of said echo cancellation filters and said second adaptive filters corresponding to said first adaptive filters when said maximum correlation value is smaller than said predetermined value.

24. The acoustic echo canceller of claim 20, 21, 22, or 23, which further comprises mean power calculating means for calculating the mean power of said acoustic echo signal and the mean power of said error of said pickup channel, and for executing the transfer of said filter coefficients when the mean power of said error is decided to be sufficiently smaller than the mean power of said acoustic echo signal.

25. The acoustic echo canceller of claim 24, wherein when the ratio between the mean power of said error and the mean power of said acoustic echo signal is smaller than a predetermined value, said transfer control means decides that the former is sufficiently smaller than the latter.

26. The acoustic echo canceller of any one of claims 17, 18, 19, 20, 21, 22, and 23, wherein said additive signal generating means is means for generating, as said additive signals, N low-correlated signals which have substantially no correlation to all of said received signals of said N receive channels.

27. The acoustic echo canceller of claim 26, wherein said additive signal generating means comprises:
   means for calculating the absolute values of said received signals in said N receive channels; and
   means for multiplying said absolute values by predetermined tuning coefficients, respectively.

28. The acoustic echo canceller of claim 26, wherein said additive signal generating means comprises;
   means for calculating the absolute value of said received signal in each of said N receive channels to obtain an absolute-value signal;
   means for counting zero-crossing points of said each received signal;
   means for alternately assigning positive and negative signs to said absolute-value signal of said each receive channel in synchronization with said zero-crossing point whenever a predetermined count value different for each receive channel is reached; and
   multiplying said absolute-value signal assigned said sign by a predetermined tuning coefficient to obtain one of said additive signals.

29. The acoustic echo canceller of claim 26, wherein said additive signal generating means comprises;
   means for calculating, at every constant time interval, the absolute values of said received signals in said N channels to obtain N absolute-value signals; and corresponding to said N receive channels; and
   means for multiplying, upon each arbitrary selection of one of receive channels, said absolute-value signal corresponding to said selected receive channel by a tuning coefficient of non-zero value and said absolute-value signals corresponding to these non-selected receive channels by tuning coefficients of zeros to produce said N low-correlated signals corresponding to said N receive channels, respectively.

30. The acoustic echo canceller of any one of claims 18, 20, 21, 22 and 23, wherein said filter coefficient updating means comprises weighting means for assigning different weights to said error to be fed back to said N first adaptive filters supplied with said received signals as the inputs thereto and said error to be fed back to said N second adaptive filters supplied with said N additive signals as the inputs thereto.

31. The acoustic echo canceller of claim 30, wherein said weighting means is means for assigning, based on the difference in power between said received and addition signals in each of said receive channels, a small weighting coefficient to said received signal of large power and a large weighting coefficient to said additive signal of small power.

32. The acoustic echo canceller of any one of claims 17, 18, 19, 20, 21, 22 and 23, wherein said received signals of said N receive channels are signals of N channels received from locations different from said sound field, and said error in said pickup channel is sent as a send signal to said different locations.

33. A recording medium on which there is recorded a program for performing, by a computer, multi-channel acoustic echo cancellation in an acoustic system which has N receive channels each containing a loudspeaker for generating a reproduced sound, N being an integer equal to or greater than 2, and at least one pickup channel containing a microphone for picking up an acoustic signal, said N loudspeakers and said microphone being placed in a common sound field, said program comprising the steps of:
   (a) generating low cross-correlated additive signals for N received signals input into said N receive channels, respectively;
   (b) adding said received signals of said N receive channels and said additive signals corresponding thereto to generate processed signals of said N receive channels;
   (c) radiating said processed signals of said N receive channels by said loudspeakers corresponding thereto;
   (d) picking up and combing, by said microphone of said at least one pickup channel a combined, acoustic echo of the reproduced sounds sneaking thereinto from said loudspeakers of said N receive channels, and inputting the combined acoustic echo into said at least one pickup channel as an acoustic echo signal; and
   (e) individually processing said N received signals and said N additive signals to generate an echo replica that simulates said acoustic echo signal in said at least one pickup channel, and subtracting said echo replica from said acoustic echo signal to thereby perform acoustic echo cancellation.

34. The recording medium of claim 33, wherein said program step (e) comprises the steps of:
   (e-1) inputting said received signals of said N receive channels into N first adaptive filters and inputting said additive signals respectively corresponding to said N receive channels into N second adaptive filters;
   (e-2) calculating the sum total of the outputs from said N first adaptive filters and said N second adaptive filters to obtain said echo replica for said pickup channel;
   (e-3) subtracting said echo replica for said pickup channel from said acoustic echo signal of said pickup channel to obtain an error while achieving the acoustic echo cancellation; and
   (e-4) feeding back said error to said N first adaptive filters and said N second adaptive filters to update their filter coefficients based on said error and said received signals and said additive signals of said N receive channels.

35. The recording medium of claim 33, wherein said program step (e) comprises the steps of:
- (e-1) assigning gains $g_{11}$ to $g_{1N}$ to said received signals of said N receive channels;
- (e-2) assigning gains $g_{21}$ to $g_{2N}$ to said additive signals corresponding to said N receive channels said gains $g_{21}$ to $g_{2N}$ for said additive signals being chosen greater than said gains $g_{11}$ to $g_{1N}$ for said received signals of said receive channels corresponding thereto;
- (e-3) adding said received signals assigned said gains and said additive signals assigned said gains in said receive channels corresponding thereto to generate N combined processed signals;
- (e-4) inputting said N combined processed signals into N adaptive filters;
- (e-5) calculating the sum total of the outputs from said N adaptive filters to obtain an echo replica corresponding to said acoustic echo signal of said pickup channel;
- (e-6) subtracting said echo replica for said pickup channel from said acoustic echo signal thereof to obtain an error while achieving said acoustic echo cancellation; and
- (e-7) feeding back said error to said N adaptive filters to update their filter coefficients based on said error and said received signals of said N receive channels assigned said gains and said additive signals assigned said gains.

36. The recording medium of claim 33, wherein said program step (e) comprises the steps of:
- (e-1) inputting said received signals of said N receive channels into N first adaptive filters and inputting said additive signals corresponding to said N receive channels into N second adaptive filters;
- (e-2) calculating a first sum total of the outputs from said N first adaptive filters and said N second adaptive filters for said pickup channel;
- (e-3) subtracting said first sum total for said pickup channel from said acoustic echo signal of said pickup channel to obtain an error;
- (e-4) feeding back said error to said N first adaptive filters and said N second adaptive filters to update their filter coefficients based on said error and said received signals and said additive signals of said N receive channels;
- (e-5) inputting said processed signals of said N receive channels into N echo cancellation filters corresponding thereto;
- (e-6) transferring filter coefficients of said N second adaptive filters to said N echo cancellation filters of said receive channels corresponding thereto;
- (e-7) calculating a second sum total of the outputs from said N echo cancellation filters to obtain said echo replica corresponding to said acoustic echo signal of said pickup channel; and
- (e-8) subtracting said echo replica from said acoustic echo signal to thereby perform said acoustic echo cancellation.

37. The method of claim 36, wherein said program step (e-6) comprises a step of transferring the filter coefficients of said N second adaptive filters corresponding to said N receive channels to said N first adaptive filters of the corresponding receive channels.

38. The recording medium of claim 36, wherein said program further comprises a step of calculating the maximum value of the correlation between said received signals of all combinations of said N receive channels and deciding whether said maximum correlation value is larger or smaller than a predetermined value, and wherein said step (e-6) comprises a step of transferring the filter coefficients of said second adaptive filters to said echo cancellation filters corresponding thereto when said maximum correlation value is larger than said predetermined value, and transferring the filter coefficients of said first adaptive filters to said echo cancellation filters corresponding thereto when said maximum correlation value is smaller than said predetermined value.

39. The recording medium of claim 36, wherein said program further comprises a step of calculating the maximum value of the correlation between said received signals of all combinations of said N receive channels and deciding whether said maximum correlation value is larger or smaller than a predetermined value, and wherein said step (e-6) comprises a step of transferring the filter coefficients of said second adaptive filters to both of said echo cancellation filters and said first adaptive filters corresponding to said second adaptive filters when said maximum correlation value is larger than said predetermined value, and transferring the filter coefficients of said first adaptive filters to both of said echo cancellation filters and said second adaptive filters corresponding to said first adaptive filters when said maximum correlation value is smaller than said predetermined value.

40. The recording medium of any one of claims 36, 37, 38, and 39, wherein said step (e-6) comprises a step of calculating the mean power of said acoustic echo signal and the mean power of said error of said pickup channel, and executing the transfer of said filter coefficients when the mean power of said error is decided to be sufficiently smaller than the mean power of said acoustic echo signal.

41. The recording medium of claim 40, wherein when the ratio between the mean power of said error and the mean power of said acoustic echo signal is smaller than a predetermined value, the former is decided to be sufficiently smaller than the latter.

42. The recording medium of any one of claims 33, 34, 35, 36, 37, 38 and 39, wherein said program step (a) is a step of generating N low-correlated signals which have substantially no correlation to all of said received signals of said N receive channels, said N low-correlated signals being used as said additive signals.

43. The recording medium of claim 42, wherein said program step (a) comprises a step of generating said low-correlated signals by: calculating the absolute values of said received signals in said N receive channels; and multiplying them by predetermined tuning coefficients, respectively.

44. The recording medium of claim 42, wherein said program step (a) is a step of generating said low-correlated signals by: calculating the absolute value of said received signal in each of said N receive channels to obtain an absolute-value signal; counting zero-crossing points of said each received signal; for each predetermined count value different for each receive channel, alternately assigning positive and negative signs to said absolute-value signal of said each receive channel in synchronization with said zero-crossing point; and multiplying said absolute-value signal by a predetermined tuning coefficient.

45. The recording medium of claim 42, wherein said program step (a) is a step of generating said low-correlated signals by:
- (a-1) calculating absolute values of said received signals in said N receive channels to produce N absolute-value signals corresponding to said N receive channels;

(a-2) selecting one of said N receive channels;

(a-3) multiplying a tuning coefficient of non-zero value by the absolute value signal corresponding to the selected receive channel and multiplying tuning coefficients of zeros by the absolute-value signals corresponding to those non-selected ones of said N receive channels;

(a-4) repeating the steps (a-1) to (a-3) every constant time interval to produce said N low-correlated signals corresponding to said N receive channels, respectively.

46. The recording medium of any one of claims 34, 36, 37 38, and 39, wherein said filter coefficient updating step is a step of updating the filter coefficients of said first and second adaptive filters by feeding back differently weighted versions of said error to said N adaptive filters supplied with said N received signals as the inputs thereto and said N second adaptive filters supplied with said N additive signals as the inputs thereto.

47. The recording medium of claim 46, wherein said differently weighting step is a step of assigning a small weighting coefficient to said received signal of large power and a large weighting coefficient to said additive signal of small power in each receive channel based on the difference in power between said received and additive signals.

48. The recording medium of any one of claims 33, 34, 35, 36, 37, 38, and 39, wherein said received signals of said N receive channels are signals of N channels received from locations different from said sound field, and said error in said pickup channel is sent as a send signal to said different locations.

* * * * *